(12) United States Patent
Casaccia et al.

(10) Patent No.: US 9,143,230 B2
(45) Date of Patent: Sep. 22, 2015

(54) METHODS AND APPARATUS FOR COMMUNICATIONS USING VISIBLE LIGHT COMMUNICATIONS SIGNALING IN COMBINATION WITH WIRELESS RADIO SIGNALING

(71) Applicant: QUALCOMM Incorporated, San Diego, CA (US)

(72) Inventors: Lorenzo Casaccia, Rome (IT); Junyi Li, Chester, NJ (US); Thomas Joseph Richardson, South Orange, NJ (US); Aleksandar Jovicic, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 424 days.

(21) Appl. No.: 13/691,753

(22) Filed: Dec. 1, 2012

(65) Prior Publication Data

US 2014/0153923 A1    Jun. 5, 2014

(51) Int. Cl.
*H04L 12/28* (2006.01)
*H04B 10/11* (2013.01)
*H04B 10/114* (2013.01)
*H04B 10/116* (2013.01)

(52) U.S. Cl.
CPC ............ *H04B 10/11* (2013.01); *H04B 10/116* (2013.01); *H04B 10/1149* (2013.01)

(58) Field of Classification Search
USPC ................. 370/401, 328, 329, 252
See application file for complete search history.

(56) References Cited

U.S. PATENT DOCUMENTS

| 8,639,124 B2* | 1/2014 | Castor et al. ................. 398/172 |
| 2007/0157258 A1 | 7/2007 | Jung et al. |
| 2011/0010090 A1 | 1/2011 | Bae et al. |
| 2011/0069951 A1* | 3/2011 | Son et al. ....................... 398/17 |

(Continued)

FOREIGN PATENT DOCUMENTS

WO    2011113385 A2    9/2011

OTHER PUBLICATIONS

Brodrick, et al., "Energy Savings Potential of Solid-State Lighting in General Illumination Applications", Building Technologies Program, U.S. Department of Energy, Jan. 2012, 84pgs.

(Continued)

*Primary Examiner* — Duc C Ho
(74) *Attorney, Agent, or Firm* — James K. O'Hare

(57) ABSTRACT

Various exemplary methods and apparatus are directed to using Visible Light Communication (VLC) in a downlink, e.g., a supplemental downlink, in combination with a wireless radio downlink/uplink pair. A gateway is coupled, via a wireline link, to a VLC access point. In some embodiments, the gateway includes a wireless radio base station. A user equipment device detects a visible light signal from the VLC access point, and transmits a radio signal to a communications device, e.g., a gateway including a base station or a macro base station, indicating that the UE device is in a VLC coverage area. The gateway configures the VLC access point to serve as a supplemental wireless cell which supports downlink communications. The gateway sends traffic signals to the VLC access point, via the wireline, which are converted by the VLC access point into VLC signals which are transmitted. The UE device receives VLC downlink traffic signals and transmits a corresponding acknowledgment signal via an uplink radio channel.

30 Claims, 19 Drawing Sheets

(56) References Cited

U.S. PATENT DOCUMENTS

2011/0069957 A1 3/2011 Kim et al.
2012/0093517 A1 4/2012 Rajagopal et al.
2013/0051264 A1* 2/2013 Wang et al. .................. 370/252

OTHER PUBLICATIONS

QUALCOMM, "HSPA Supplemental Downlink", Qualcomm, Aug. 2012, 3 pgs.
Bouchet O., et al., "Hybrid wireless optics (HWO): Building the next-generation home network", Communication Systems, Networks and Digital Signal Processing, 2008. CNSDSP 2008. 6th International Symposium on, IEEE, Piscataway, NJ, USA, Jul. 25, 2008, pp. 283-287, XP031314888, ISBN: 978-1-4244-1875-6.
Brien D.O, "Some challenges for visible light communications ; 15-08-0131-00-0v1c-some-challenges-for-visible-light-communications", IEEE Draft; 15-08-0131-00-0VLC-Some-Challenges-for-Visible-Light-Communications, IEEE-SA Mentor, Piscataway, NJ USA, vol. 802.15SGVLC, Mar. 17, 2008, pp. 1-25, XP017668350.
International Search Report and Written Opinion—PCT/US2013/072387—ISA/EPO—May 9, 2014.
Rahaim, et al., "A Hybrid Radio Frequency and broadcast Visible Light Communication system", IEEE GLOBECOM Workshops (GK Wkshps), Dec. 2011, pp. 792-796.
Vucic, et al., "513 Mbit/s Visible Light Communications Link Based on DMT-Modulation of a White LED", Journal of Lightwave Technology, vol. 28, No. 24, Dec. 15, 2010, pp. 3512-3518.

* cited by examiner

METHODS AND APPARATUS FOR COMMUNICATIONS USING VISIBLE LIGHT COMMUNICATIONS SIGNALING IN COMBINATION WITH WIRELESS RADIO SIGNALING

FIELD

The present application relates to communications and, more particularly, to methods and apparatus for communicating using visible light signals in combination with wireless radio signals.

BACKGROUND

The concept of Supplemental Downlink was introduced in Long Term Evolution (LTE) Release 9 and is being extended for Release 10 to include up to three additional carriers in unpaired spectrum. The unpaired spectrum is used only for downlink, whereas the paired spectrum is used for both downlink and uplink.

Typically, the paired spectrum and unpaired spectrum is used to carry wireless radio signals, e.g., LTE wireless radio signals. However, there are limitations on the unpaired available spectrum which may be available.

Light Emitting Diodes (LEDs) capable of generating white light are expected to become the dominant source of lighting in the commercial and residential sectors in the future. Recent research has demonstrated that such LEDs can be intensity modulated at a high bandwidth. When combined with the high optical power intensities (tens of Watts) in typical indoor lighting conditions, the high modulation rate offers the potential for broadband wireless data communication in the hundreds of Mbps.

Based on the above discussion, it would be beneficial if this potential capacity of visible light communications (VLC) was utilized. Although it appears that LED lighting, e.g., within a building, is a viable means for adaptation to create a VLC transmission downlink, it may not be commercially practical to try to create a VLC uplink including VLC transmissions from user equipment (UE) devices to an access point, e.g., due to hardware considerations, interference considerations, battery power considerations, cost, etc. One of the key challenges with utilizing Visible Light Communication (VLC), is the absence of an uplink, e.g., a reverse link, corresponding to a VLC downlink. In order to efficiently manage a downlink including traffic data, it is beneficial to have feedback via an uplink, e.g., for communicating signals including acknowledgments.

Based on the above discussion, it would be advantageous if new methods and apparatus were developed to make use of the potentially available VLC downlink in an efficient manner.

SUMMARY

Various exemplary methods and apparatus are directed to using Visible Light Communication (VLC) in a downlink, e.g., a supplemental downlink, in combination with a wireless radio downlink/wireless radio uplink pair. Various embodiments are well suited for using the visible light spectrum as a supplemental downlink band in combination with an LTE paired TDD spectrum. A gateway, including a wireless radio base station, is coupled via a wireline, e.g., a powerline link, to a VLC access point. The gateway may, and sometimes does, configure a VLC access point to serve as a supplemental wireless cell which supports downlink communications via visible light communication. Thus, the gateway may, and sometimes does, support the communication of downlink data and information to user equipment (UE) devices using a wireless radio downlink and a visible light communications downlink.

In some but not necessarily all embodiments a user equipment (UE) device is implemented as a mobile wireless terminal including a wireless radio receiver, a wireless radio transmitter and a VLC receiver. In at least some embodiments, a UE device monitors for and detects a visible light signal, e.g., a VLC beacon signal providing access point identification information, transmitted by a VLC access point. The VLC beacon signal may, and in some embodiments does, include a SSID (Service Set Identifier) of the VLC access point or a PSK (pre-shared key) used by the VLC access point. In response to detecting a light signal from a VLC access point, the UE device transmits a radio signal to the gateway indicating that the UE device is located in the VLC coverage area of the VLC access point from which the VLC signal was received. The transmitted radio signal may, and in some embodiments does, include VLC access point identification information received in a VLC beacon signal.

The gateway may, and in some embodiments does send, via a wireline link between the gateway and identified VLC access point, traffic signals. The VLC access point converts the wireline signals into VLC signals which are transmitted by the VLC access point to the UE device. The UE device receives the VLC downlink traffic signals which it then acknowledges via radio signals that are sent to the gateway. Thus, in some embodiments the UE device sends an acknowledgment signal to the gateway, corresponding to the VLC downlink traffic signals, via an uplink radio channel. The transmission of the acknowledgement signal via the radio channel may, and in some embodiments is, synchronized with the VLC downlink light channel transmissions. Thus, in at least in some but not necessarily all embodiments, VLC signal are acknowledged via the radio link. In some embodiments, in addition, to the VLC acknowledgment signal, other uplink signals corresponding to the VLC downlink are communicated via the wireless radio uplink.

An exemplary method of operating a gateway, in accordance with some embodiments, includes receiving a signal from a user equipment (UE) device indicating that the UE device is in a visible light communications (VLC) coverage area and configuring a visible light communications access point controlled by said gateway as a supplemental wireless cell which supports downlink communications. A gateway, in accordance with some embodiments, includes at least one processor configured to: receive a signal from a user equipment (UE) device indicating that the UE device is in a visible light communications (VLC) coverage area and configure a visible light communications access point controlled by said gateway as a supplemental wireless cell which supports downlink communications. The gateway further includes memory coupled to said at least one processor.

An exemplary method of operating user equipment (UE) device, in accordance with some embodiments, includes detecting a light signal from a visible light communications (VLC) access point and transmitting a radio signal to a communications device indicating that the UE device is in a visible light communications (VLC) coverage area, wherein said communications device is a gateway or a macro base station. An exemplary user equipment (UE) device, in accordance with some embodiments, includes at least one processor configured to detect a light signal from a visible light communications (VLC) access point and transmit a radio signal to a communications device indicating that the UE device is in an a visible light communications (VLC) coverage area, wherein said communications device is a gateway or a macro base station. The exemplary UE device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
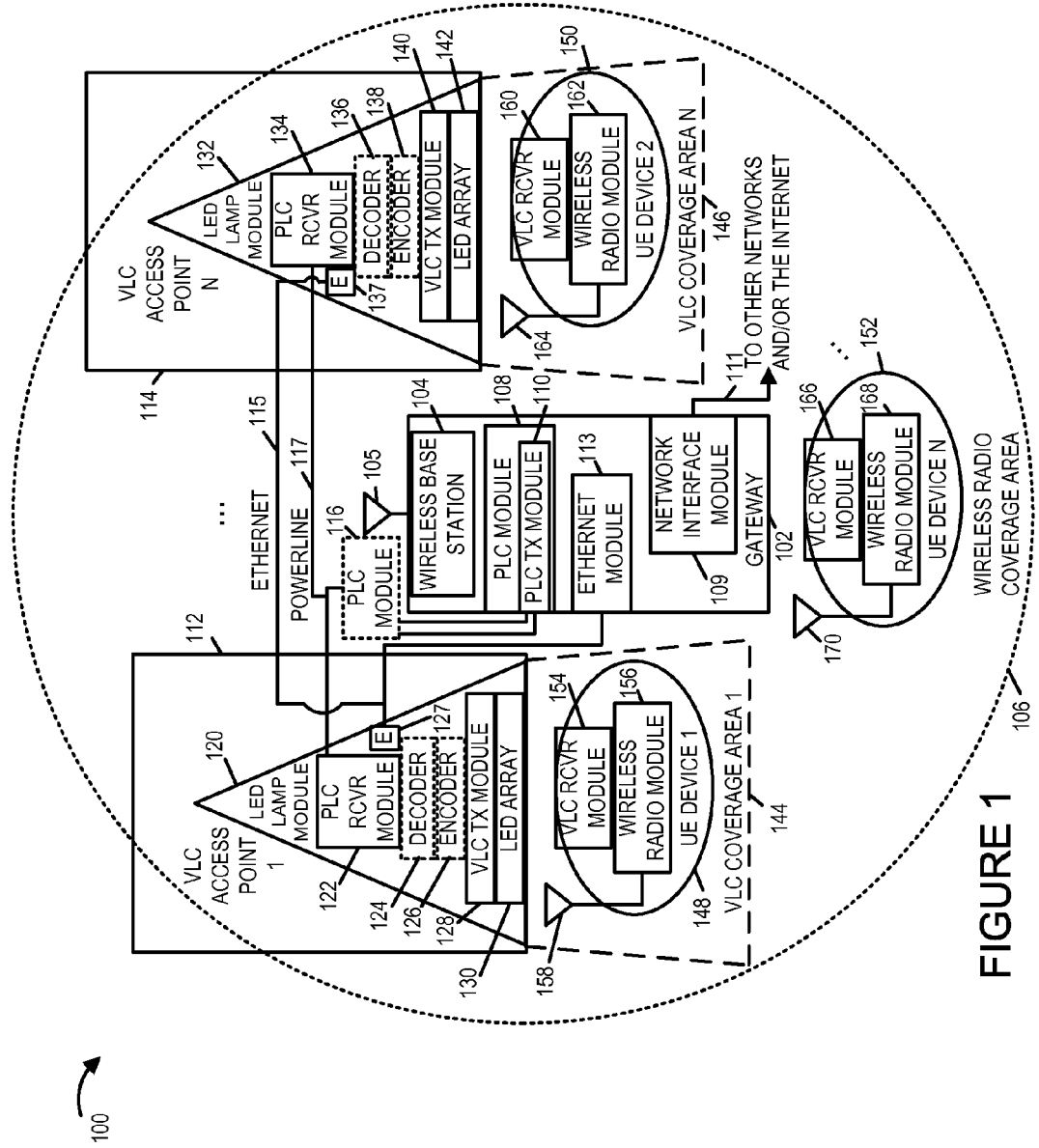
FIG. 1 is a drawing of an exemplary communications system in accordance with various embodiments.

FIG. 1 is a drawing of an exemplary communications system 100 in accordance with various embodiments. Exemplary communications system 100 includes a gateway 102 and a plurality of visible light communications (VLC) access points (VLC access point 1 112, . . . , VLC access point N 114). Exemplary communications system 100 further includes a plurality of user equipment (UE) devices (UE device 1 148, UE device 2 150, . . . , UE device N 152). At least some of the UE devices (148, 150, . . . , 152) are mobile devices which may move throughout the system 100.

Gateway 102 includes a wireless base station 104 with corresponding antenna 105, and a powerline communications (PLC) module 108 including a PLC transmitter module 110. Gateway 102 is coupled to a powerline 117 via PLC module 116, e.g., a powerline interface module. In some embodiments, PLC module 116 is not included and PLC module 108 is coupled directly to the powerline 117. VLC access point 1 112 includes a light emitting diode (LED) lamp module 120. LED lamp module 120 includes a PLC receiver module 122, a VLC transmitter module 128 and an LED array 130. In some embodiments, LED lamp module 120 further includes a decoder module 124 and an encoder module 126. VLC access point 1 112 has a corresponding VLC coverage area 1 144.

Gateway 102 further includes a network interface module 109 which couples the gateway 102 to other networks and/or the Internet via link 111. In some embodiments, gateway 102 receives content from other networks and/or the Internet via link 111 and network interface module 109. In some such embodiments, gateway 102 then the forwards at least some of the received content to one or more VLC access points, e.g., VLC access point 1 112. The VLC access point, e.g., VLC access point 1 112, then transmits the content to one or more UE devices, e.g., UE device 1 148, which are located within its VLC coverage area.

VLC access point N 114 includes a light emitting diode (LED) lamp module 132. LED lamp module 132 includes a PLC receiver module 134, a VLC transmitter module 140 and a LED array 142. In some embodiments, LED lamp module 132 further includes a decoder module 136 and an encoder module 138. VLC access point N 114 has a corresponding VLC coverage area N 146.

UE device 1 148 includes a VLC receiver module 154 and a wireless radio module 156. Wireless radio module 156 is coupled to antenna 158. UE device 2 150 includes a VLC receiver module 160 and a wireless radio module 162. Wireless radio module 162 is coupled to antenna 164. UE device N 152 includes a VLC receiver module 166 and a wireless radio module 168. Wireless radio module 168 is coupled to antenna 170.

PLC transmitter module 110 of gateway 102 is coupled to PLC receiver module 122 of LED lamp module 120 of VLC access point 1 112 via PLC module 116 and a powerline 117. Powerline 117 serves as a communications link and is therefore sometimes referred to a powerline link. PLC transmitter module 110 of gateway 102 is further coupled to PLC receiver module 134 of LED lamp module 132 of VLC access point N 114 via PLC module 116 and powerline 117.

In some embodiments, at least some different VLC access points correspond to different rooms in a building. In some embodiments, at least some different VLC access points correspond to different portions of the same room in a building.

In the example of FIG. 1, UE device 1 148, UE device 2 150 and UE device N 152 are within the wireless radio coverage area 106 of wireless base station 104 of gateway 102. UE devices (148, 150, 152) may receive downlink radio signals from wireless base station 104 and transmit wireless radio uplink signals to wireless base station 104. Continuing with the example, UE device 1 148, which is located within the VLC coverage area 1 144, may receive downlink VLC signals from VLC access point 112 communicating information from gateway 102. The information conveyed via the downlink VLC signals was communicated between gateway 102 and VLC access point 1 112 via PLC module 116 and powerline 117 prior to VLC communication of the information to UE device 1 148. Communication between gateway 102 and VLC access point 1 112 is by way of PLC module 116 and powerline 117. In some embodiments, e.g., some embodiments, in which decoder 124 and encoder 126 are not included, the gateway 102 transmits powerline communications signals which control, e.g., directly, the LED array 130 output to produce VLC communications signals. In some embodiments, e.g., some embodiments, in which decoder 124 and encoder 126 are included, the gateway 102 transmits powerline communications signals which are decoded by decoder module 124 and encoded by encoder module 126 to generate VLC communications signals.

Continuing with the example, UE device 2 150, which is located within the VLC coverage area N 146, may receive downlink VLC signals from VLC access point N 114 communicating information from gateway 102. The information conveyed via the downlink VLC signals was communicated between gateway 102 and VLC access point N 114 via PLC module 116 and powerline 117 prior to VLC communication of the information to the UE device 2 150. Communication between gateway 102 and VLC access point N 114 is by way of PLC module 116 and powerline 117. In some embodiments, e.g., some embodiments, in which decoder 136 and encoder 138 are not included, the gateway 102 transmits powerline communications signals which control, e.g., directly, the LED array 142 output to produce VLC communications signals. In some embodiments, e.g., some embodiments, in which decoder 136 and encoder 138 are included, the gateway 102 transmits powerline communications signals which are decoded by decoder module 136 and encoded by encoder module 138 to generate VLC communications signals.

Exemplary VLC signals transmitted by VLC access point 1 112 and received by VLC receiver module 154 of UE device 1 148 include a light beacon signal, VLC synchronizations signals and downlink VLC traffic signals. In various embodiments, VLC receiver module 154 includes a photodiode. Exemplary downlink signals transmitted by wireless base station 104 via antenna 105 and received by wireless radio module 156 of UE device 1 148 via antenna 158 include synchronization signals, light channel transmission scheduling signals, radio channel transmission scheduling signals, and downlink radio traffic signals. Exemplary uplink signals transmitted by wireless radio module 156 of UE device 1 148 via antenna 158 and received by wireless base station 104 via antenna 105 include uplink traffic signals, acknowledgment signals corresponding to downlink light channel signals, and acknowledgment signals corresponding to downlink radio channel signals.

Exemplary VLC signals transmitted by VLC access point N 114 and received by VLC receiver module 160 of UE device 2 150 include a light beacon signal, VLC synchronizations signals and downlink VLC traffic signals. In various embodiments, VLC receiver module 160 includes a photodiode. Exemplary downlink signals transmitted by wireless base station 104 via antenna 105 and received by wireless radio module 162 of UE device 2 150 via antenna 164 include synchronization signals, light channel transmission scheduling signals, radio channel transmission scheduling signals, and downlink radio traffic signals. Exemplary uplink signals transmitted by wireless radio module 162 of UE device 2 150 via antenna 164 and received by wireless base station 104 via antenna 105 include uplink traffic signals, acknowledgment signals corresponding to downlink light channel signals, and acknowledgment signals corresponding to downlink radio channel signals.

In some embodiments, a VLC downlink is a supplemental downlink corresponding to a radio FDD downlink and radio FDD uplink pair. In various embodiments, downlink light channel time slots are synchronized with powerline communications time slots used to supply data to a VLC access point via a wireline, e.g., powerline, communications link.

In some embodiments, the gateway 102 includes an Ethernet module 113, and LED lamp modules (120, ..., 132) of the VLC access points (112, ..., 114) also include an Ethernet module (127, ..., 137), respectively, which are coupled together via Ethernet 115. In some such embodiments, the Ethernet 115 is used for communications between the gateway 102 and the VLC access points (112, ..., 114) instead of the powerline 117. In some such embodiments, various signals, described above as being communicated over the powerline 117 are instead communicated over the Ethernet 115. Thus, in some embodiments, the information conveyed via the downlink VLC signals was communicated between gateway 102 and VLC access point 1 112 via Ethernet 115, prior to VLC communication of the information to UE device 1 148. Thus, in some embodiments, communication between gateway 102 and VLC access point 1 112 is by way Ethernet 115.

In some embodiments, a first portion of the VLC access points (112, ..., 114) communicate with the gateway 102 via powerline 117 and a second portion of the VLC access points (112, ..., 114) communicate with the gateway 102 via Ethernet 115.

Figure 2:
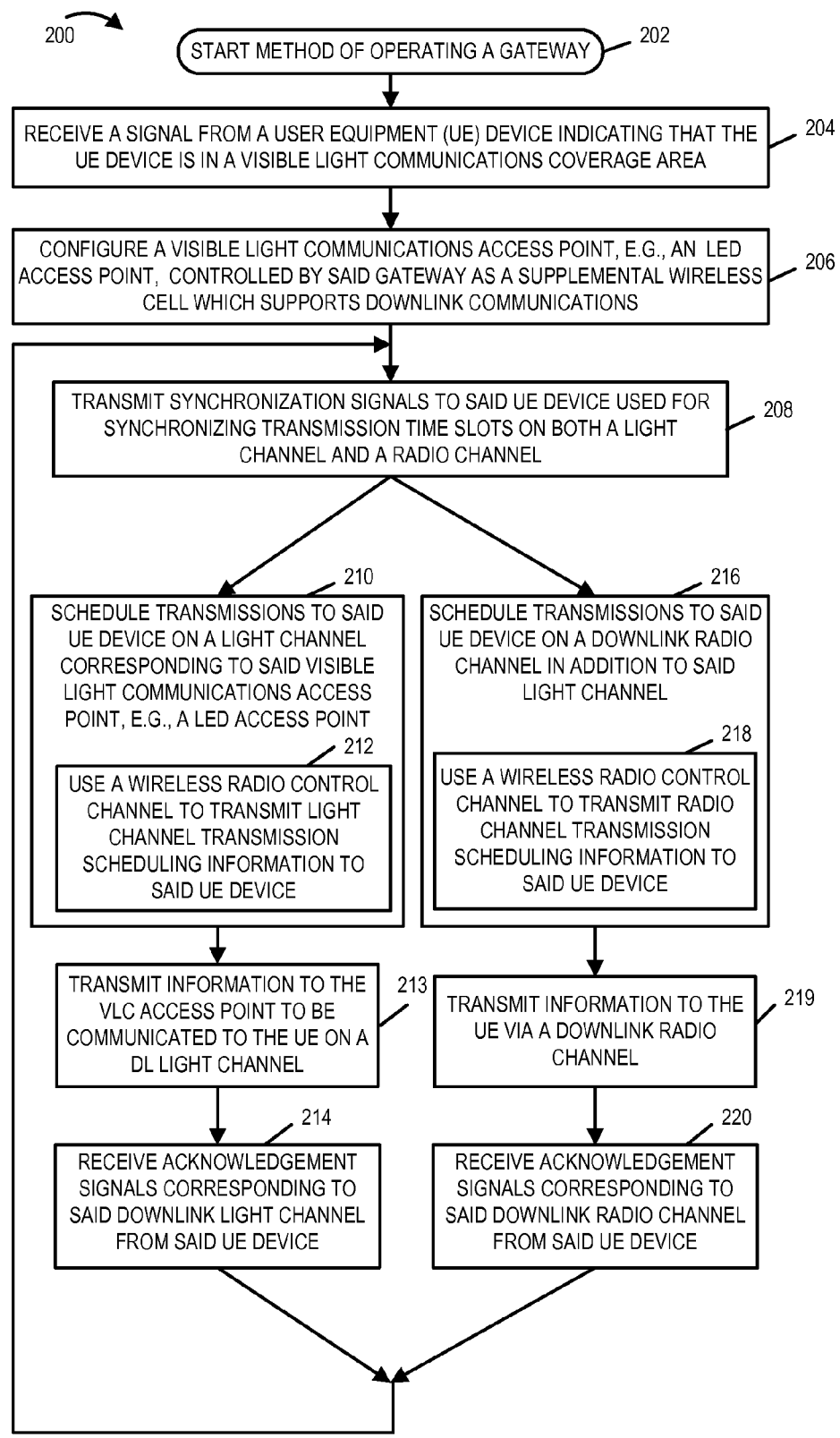
FIG. 2 is a flowchart of an exemplary method of operating a gateway in accordance with an exemplary embodiment.

FIG. 2 is a flowchart 200 of an exemplary method of operating a gateway in accordance with an exemplary embodiment. The gateway is, e.g. gateway 102 of system 100 of FIG. 1. Operation starts in step 202, where the gateway is powered on and initialized. Operation proceeds from step 202 to step 204. In step 204, the gateway receives a signal (e.g., a radio signal) from a user equipment (UE) device indicating that the UE device is in a visible light communications coverage area. The UE device is, e.g., a mobile wireless terminal Operation proceeds from step 204 to step 206.

In step 206, the gateway configures a visible light communications access point, e.g., a light emitting diode (LED) access point, controlled by said gateway, as a supplemental wireless cell which supports downlink communications (e.g., visible light communications). In some embodiments, configuring said visible light communications access point includes assigning said UE device to a light channel. In some such embodiments, the light channel corresponds to a set of light intensity modulation frequency and time resources, said time resources having a predetermined relationship with a wireless radio channel used by said gateway. The timing synchronization between resources on the light channel with resources on the wireless radio channel allows for coordination of the transmission of signals over the wireless radio channel and light channel. For example, in some but not necessary all embodiments, signals received on the light channel may be acknowledged via the wireless radio channel with the time of the wireless resources used to acknowledge a light channel signal occurring at a specific time offset from the light signal transmission. In some embodiments, the visible light communications access point, e.g., LED access point, is coupled to the gateway by a powerline communications link. In some embodiments, the visible light communications access point, e.g., LED access point, is coupled to the gateway by an Ethernet communications link. In some embodiments, the supplemental wireless cell is a LTE SCell. Operation proceeds from step 206 to step 208.

In step 208, the gateway transmits synchronization signals to said UE device used for synchronizing transmission time slots on both a light channel and a radio channel. Operation proceeds from step 208 to step 210 and step 216.

In step 210, the gateway schedules transmission to said UE device on a light channel corresponding to said visible light communications access point, e.g., a LED access point. Step 210 includes step 212 in which the gateway uses a wireless radio control channel to transmit light channel transmission scheduling information to said UE device. In some embodiments, the light channel on which transmissions are scheduled is the light channel to which the UE device was assigned.

Operation proceeds from step 210 to step 213. In step 213, the gateway transmits information to the VLC access point to be communicated to the UE on a DL light channel. In some embodiments, the information to be communicated is traffic data to be communicated to the UE via a downlink light channel of the VLC access point. In some such embodiments, the traffic data to be communicated via the downlink light channel corresponds to the scheduling of step 210. In some embodiments, the transmission of information to the access point in step 213 is via PLC signals. In some embodiments, the transmission of information to the access point in step 213 is via Ethernet signals. Operation proceeds from step 213 to step 214.

In step 214, the gateway receives acknowledgement signals corresponding to the downlink light channel from said UE device, e.g., an acknowledgment to traffic data communicated over a scheduled VLC downlink light channel. In various embodiments, the acknowledgment signals received in step 214 are received on a radio uplink channel that is synchronized with said downlink light channel. In some such embodiments, downlink light channel time slots are synchronized with wireline, e.g., powerline, communications time slots used to supply data to said visible light communications access point, e.g., LED access point, via a wireline communications link. In some such embodiments, the wireline is a powerline. In some embodiments, downlink light channel time slots are synchronized with wireline, e.g., Ethernet, communications time slots used to supply data to said visible light communications access point, e.g., LED access point, via a wireline communications link. In some such embodiments, the wireline is an Ethernet.

Returning to step 216, in step 216 the gateway schedules transmission to said UE device on a downlink radio channel in addition to said light channel. Step 216 includes step 218, in which the gateway uses a wireless radio control channel to transmit radio channel transmission scheduling information to said UE device. Operation proceeds from step 216 to step 219. In step 219, the gateway transmits information to the UE via a downlink radio channel. In some embodiments, the information to be communicated is traffic data to be communicated to UE. In some such embodiments, the traffic data to be communicated via the downlink radio channel corresponds to the scheduling of step 216. Operation proceeds from step 219 to step 220.

In step 220, the gateway receives acknowledgement signals corresponding to said downlink radio channel from said UE device. Operation proceeds from step 214 and 220 to step 208.

Figure 3:
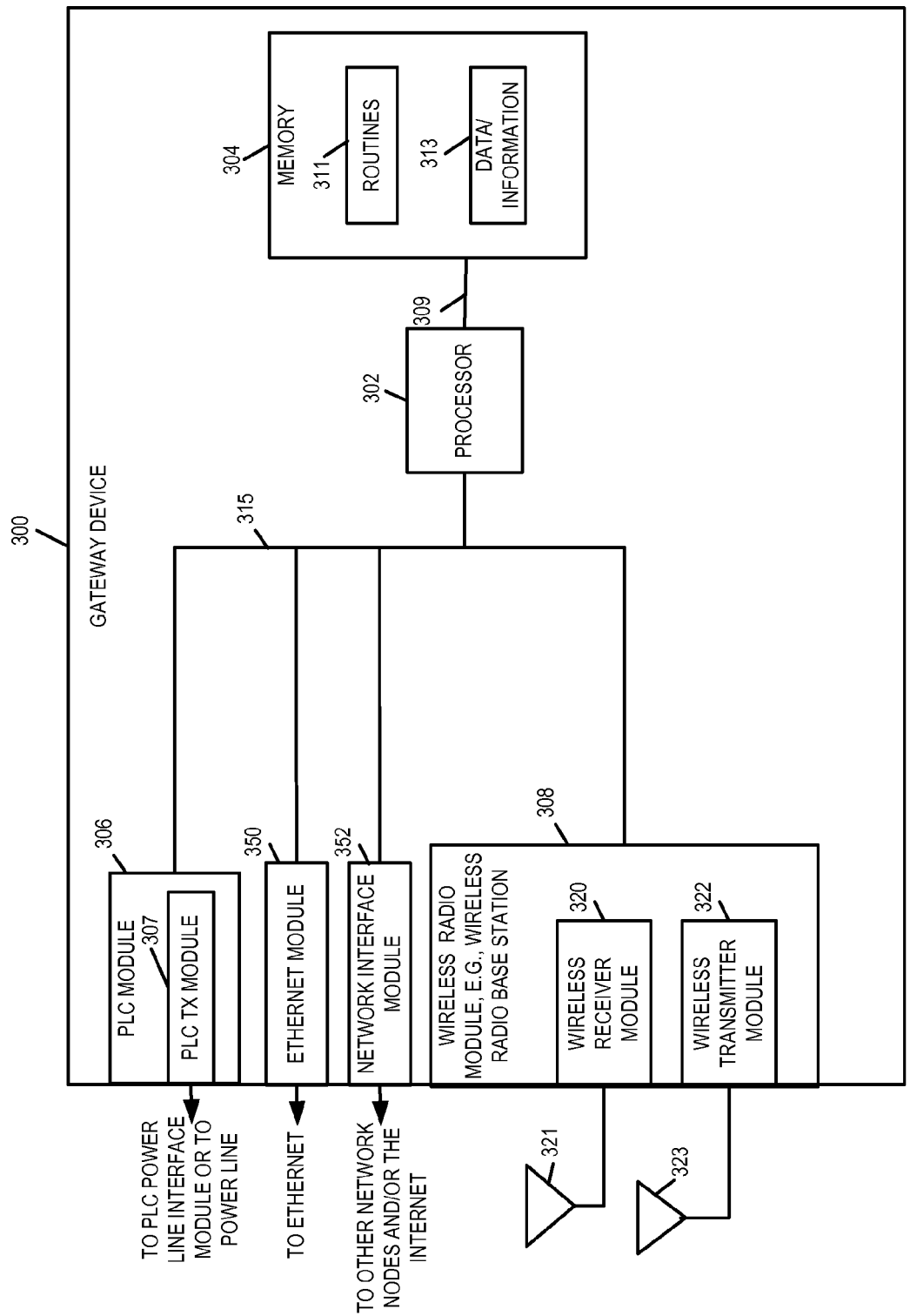
FIG. 3 is a drawing of an exemplary gateway in accordance with an exemplary embodiment.

FIG. 3 is a drawing of an exemplary gateway device 300 in accordance with an exemplary embodiment. Gateway device 300 is, e.g., gateway 102 of system 100 of FIG. 1. Gateway 300 may, and sometimes does, implement a method in accordance with flowchart 200 of FIG. 2. Gateway 300 includes a processor 302 and memory 304 coupled together via a bus 309 over which the various elements (302, 304) may interchange data and information. Memory 304 includes routines 311 and data/information 313. Gateway 300 further includes a powerline communications (PLC) module 306 and a wireless radio module 308, e.g., a wireless radio base station. The PLC module 306 and wireless radio module 308 are coupled to processor 302 via bus 315. PLC module 306 includes a PLC transmitter module 307 for transmitting PLC signals, e.g., PLC signals directed to VLC access points. In some embodiments, the PLC module 306 is connected to the power line. In some other embodiments, the PLC module 306 is connected to a PLC interface module connected to the power line. In various embodiments, transmitted PLC signals transmitted by PLC transmitter module 307 communicate, e.g., configuration information for a VLC access point or traffic data to be communicated on a VLC downlink channel intended for a UE device, e.g., a mobile wireless terminal.

Gateway device 300 further includes an Ethernet module 350 and a network Interface module 352, which are coupled to processor 302 via bus 315. Ethernet module 350 couples the gateway device 300 to an Ethernet. In some embodiments, transmitted signals over the Ethernet transmitted by Ethernet module 350 communicate, e.g., configuration information for a VLC access point or traffic data to be communicated on a VLC downlink channel intended for a UE device, e.g., a mobile wireless terminal. Network interface module 352 couples the gateway 300 to other network nodes and/or the Internet.

Wireless radio module 308, e.g., a base station, includes a wireless receiver module 320, e.g., an LTE receiver, coupled to receive antenna 321, via which gateway 300 receives uplink radio signals from UE devices. The uplink radio signals include, e.g., uplink traffic data signals, acknowledgement signals to received VLC channel downlink traffic signals from a VLC access point, and acknowledgement signals to received radio channel downlink traffic signals from the gateway. Wireless radio module 308 further includes a wireless transmitter module 322, e.g., an LTE transmitter, coupled to transmit antenna 323, via which gateway 300 transmits downlink radio signals to UE devices. The downlink radio signals include, e.g., synchronization signals, assignment signals corresponding to a VLC downlink channel, assignment signals corresponding to radio downlink channel, and downlink traffic channel data signals. In some embodiments, the same antenna is used for downlink and uplink.

In various embodiments, processor 302 is configured to receive a signal (e.g., via wireless receiver module 320) from a user equipment (UE) device, e.g., mobile wireless terminal, indicating that the UE device is in a visible light communications (VLC) coverage area. In some such embodiments, processor 302 is further configured to configure a visible light communications access point controlled by said gateway as a supplemental wireless cell which supports downlink communications, e.g., in response to receiving the signal from the UE device indicating that the UE device is in a visible light communications coverage area. In some embodiments, the supplemental wireless cell which supports downlink communications is a LTE SCell. In some embodiments, the visible light communications access point is an LED access point coupled to said gateway by a powerline communications link. In some embodiments, the visible light communications access point is an LED access point coupled to said gateway by an Ethernet communications link.

In some embodiments, processor 302 is configured to assign said UE device to a light channel, as part of being configured to configure said visible light communications access point. In some such embodiments, the light channel corresponds to a set of visible light intensity modulation frequency and time resources, said time resources having a predetermined relationship with a wireless radio channel used by said gateway.

In some embodiments, processor 302 is configured to schedule transmissions to said UE device on a light channel corresponding to said visible light communications access point. In various embodiments, the light channel on which transmission are scheduled is the light channel to which the UE device was assigned. In some such embodiments, processor 302 is further configured to use a wireless radio control channel to transmit light channel transmission scheduling information to said user equipment device.

In some embodiments, processor 302 is configured to use a wireless radio control channel to transmit radio channel transmission scheduling information to said user equipment device. In various embodiments, processor 302 is configured to transmit synchronization signals to said user equipment device used for synchronizing transmission time slots on both said light channel and a radio channel.

In various embodiments, processor 302 is configured to schedule transmission to said UE device on a downlink radio channel in addition to said light channel. In some embodiments, processor 302 is further configured to receive acknowledgement signals corresponding to said downlink light channel from said UE device. In some such embodiments, said acknowledgements signals are received on a radio uplink channel that is synchronized with said downlink light channel. In various embodiments, downlink light channel time slots are synchronized with wireline, e.g., powerline, communications time slots used to supply data to said visible light communications access point via a wireline, e.g., powerline, communications link. In some embodiments, downlink light channel time slots are synchronized with wireline, e.g., Ethernet, communications time slots used to supply data to said visible light communications access point via a wireline, e.g., Ethernet, communications link.

Figure 4:
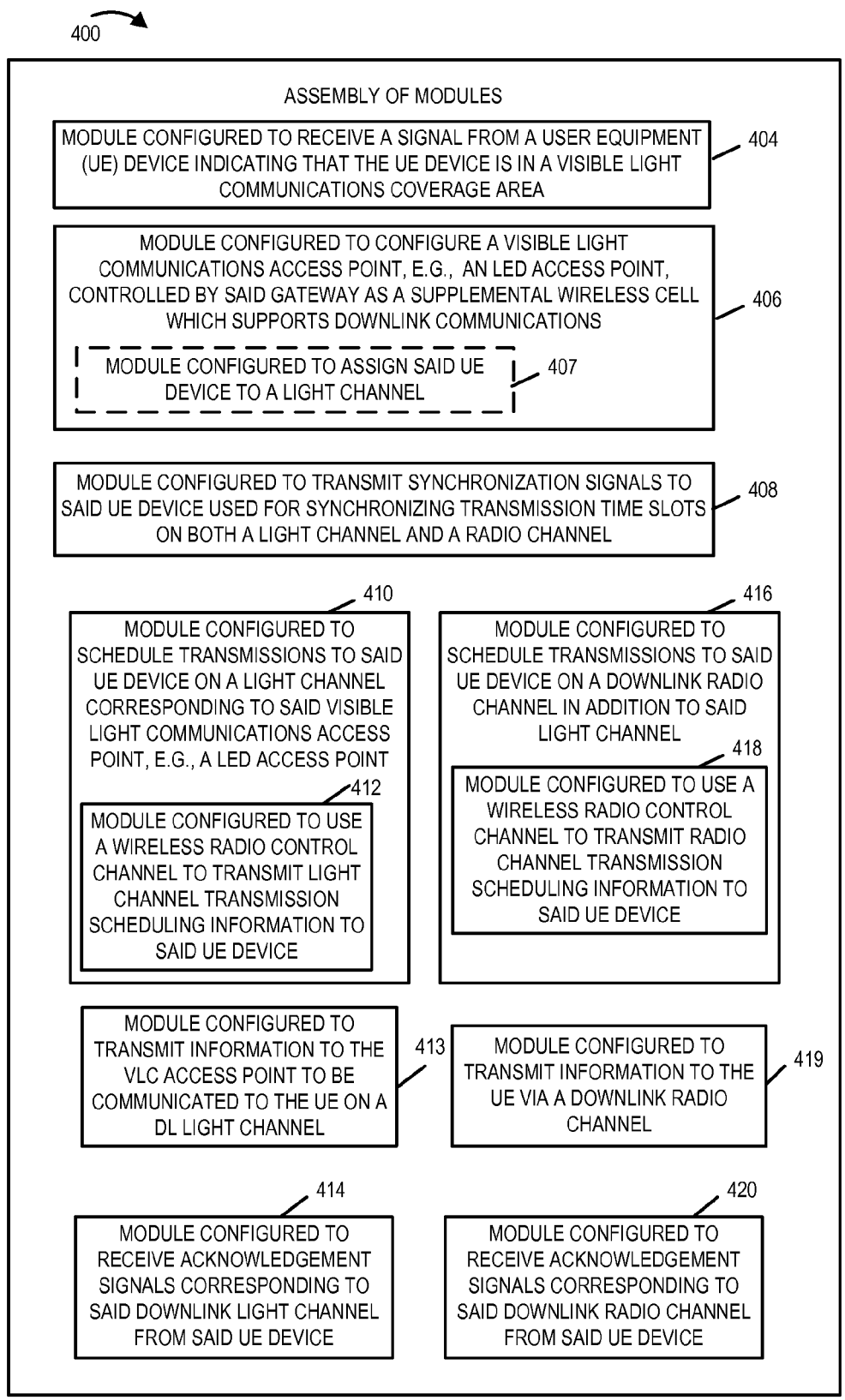
FIG. 4 is an assembly of modules which may be included in the gateway of FIG. 3 in accordance with an exemplary embodiment.

FIG. 4 is an assembly of modules 400 which can, and in some embodiments is, used in the gateway 300 illustrated in FIG. 3. The modules in the assembly 400 can, and in some embodiments are, implemented fully in hardware within the processor 302, e.g., as individual circuits. In other embodiments some of the modules are implemented, e.g., as circuits, within the processor 302 with other modules being implemented, e.g., as circuits, external to and coupled to the processor. In some embodiments, some of the modules included in assembly of modules 400 are included within one or more of PLC module 306 or wireless radio module 308. In various embodiments, one or more of PLC module 306 or wireless radio module 308 are included within processor 302. As should be appreciated the level of integration of modules on the processor and or with some modules being external to the processor may be one of design choice. Alternatively, rather than being implemented as circuits, all or some of the modules may be implemented in software and stored in the memory 304 of gateway 300 shown in FIG. 3 with the modules controlling operation of the gateway 300 to implement the functions corresponding to the modules when the modules are executed by a processor, e.g., processor 302. In still other embodiments, various modules are implemented as a combination of hardware and software, e.g., with a circuit external to the processor 302 providing input to the processor 302 which then under software control operates to perform a portion of a module's function.

While shown in the FIG. 3 embodiment as a single processor 302, e.g., computer, within gateway device 300, it should be appreciated that processor 302 may be implemented as one or more processors, e.g., computers. When implemented in software, the modules include code, which when executed by the processor, configure the processor, e.g., computer, to implement the function corresponding to the module. In some embodiments, processor 302 is configured to implement each of the modules of the assembly of modules 400. In embodiments where the assembly of modules 400 is stored in memory 304, and the memory 304 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the gateway device 300 or elements therein such as the processor 302 to perform the functions of the corresponding steps illustrated and/or described in the method of flowchart 200 of FIG. 2.

FIG. 4 is an assembly of modules 400 in accordance with various exemplary embodiments. Assembly of modules 400 includes a module 404 configured to receive a signal from a user equipment (UE) device, e.g., a mobile wireless terminal, indicating that the UE device is in a visible light communications coverage area, a module 406 configured to configure a visible light communications access point, e.g., a LED access point, controlled by said gateway, as a supplemental wireless cell which supports downlink communications, e.g., a LTE SCell, and a module 408 configured to transmit synchronization signals to said UE device used for synchronizing transmission time slots on both a light channel and a radio channel. In some embodiments, module 406 includes a module 407 configured to assign said UE device to a light channel. In some such embodiments, the light channel corresponds to a set of visible light intensity modulation frequency and time resources, said time resources having a predetermined timing relationship with a wireless radio channel used by said gateway. The timing synchronization between resources on the light channel with resources on the wireless radio channel allows for coordination of the transmission of signals over the wireless radio channel and light channel. For example, in some but not necessary all embodiments, signals received on the light channel may be acknowledged via the wireless radio channel with the time of the wireless resources used to acknowledge a light channel signal occurring at a specific time offset from the light signal transmission. Assembly of modules 400 further includes a module 410 configured to schedule transmission to said UE device on a light channel corresponding to said visible light communications access point, e.g., a LED access point, and a module 416 configured to schedule transmission to said UE device on a downlink radio channel in addition to said light channel. In some embodiments, the light channel on which transmissions are scheduled is the light channel to which the UE device was assigned. Module 410 includes a module 412 configured to use a wireless radio control channel to transmit light channel transmission scheduling information to said UE device, and module 416 includes a module 418 configured to use a wireless radio control channel to transmit radio channel transmission scheduling information to said UE device. Assembly of modules 400 further includes a module 413 configured to transmit information to a VLC access point to be communicated on a downlink light channel and a module 419 configured to transmit information to the UE via a downlink radio channel. Assembly of modules 400 further includes a module 414 configured to receive acknowledgement signals corresponding to said downlink light channel from said UE device and a module 420 configured to receive acknowledgement signals corresponding to said downlink radio channel from said UE device. In various embodiments, the acknowledgments received by module 414 are received on a radio uplink channel that is synchronized with said downlink light channel. In some embodiments, downlink channel time slots are synchronized with wireline, e.g., powerline communications time slots used to supply data to said visible light communications access point via a wireline communications link.

Figure 5:
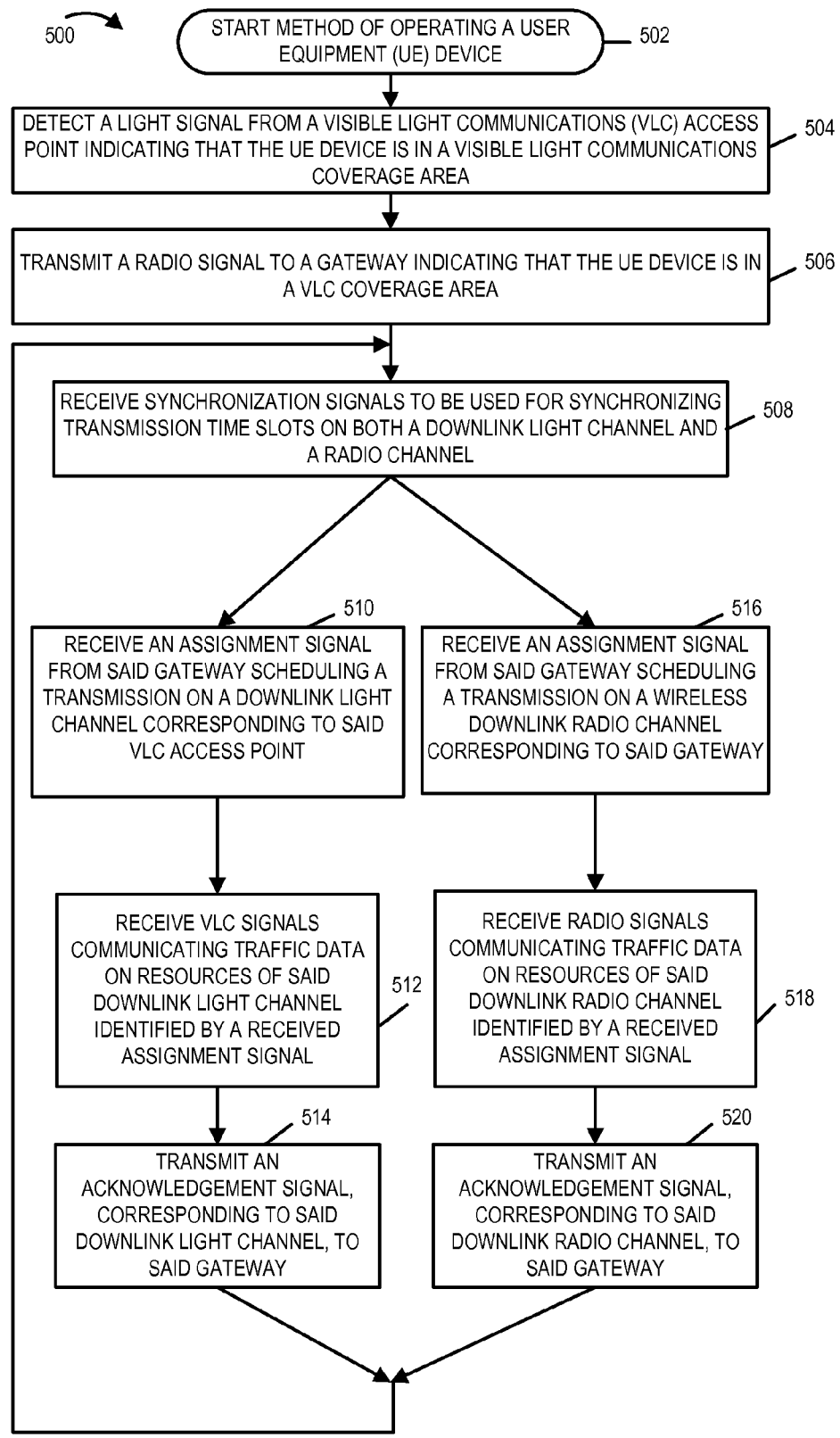
FIG. 5 is a flowchart of an exemplary method of operating a user equipment (UE) device in accordance with an exemplary embodiment.

FIG. 5 is a flowchart 500 of an exemplary method of operating a user equipment (UE) device, e.g., a mobile wireless terminal, in accordance with an exemplary embodiment. Operation of the method starts in step 502, where the UE device is powered on and initialized. Operation proceeds from step 502 to step 504.

In step 504, the UE device detects a light signal from a visible light communications (VLC) access point indicating that the UE device is in a visible light communications coverage area. In some embodiments, the VLC access point is a LED access point coupled to a gateway by a powerline communications link. In some embodiments, the VLC access point is a LED access point coupled to a gateway by an Ethernet communications link. Operation proceeds from step 504 to step 506.

In step 506, the UE device transmits a radio signal to a gateway indicating that the UE device is in a VLC coverage area. Operation proceeds from step 506 to step 508.

In step 508, the UE device receives synchronization signals to be used for synchronizing transmission time slots on both a downlink light channel and a radio channel. Operation proceeds from step 508 to steps 510 and 516.

In step 510, the UE device receives an assignment signal from said gateway scheduling a transmission on a downlink light channel corresponding to said VLC access point. In some embodiments, the received assignment signal from the gateway scheduling transmission on a downlink light channel corresponding to said VLC access point is received on a wireless radio control channel. Operation proceeds from step 510 to step 512. In step 512, the UE device receives VLC signals communicating traffic data on resources of said downlink light channel identified by a received assignment signal. Operation proceeds from step 512 to step 514, in which the UE device transmits an acknowledgment signal corresponding to said downlink light channel to said gateway. In various embodiments, the acknowledgment signal transmitted in step 514 is transmitted on a radio uplink channel that is synchronized with said downlink light channel. In some embodiments, downlink light channel time slots are synchronized with wireline, e.g., powerline, communications time slots used to supply data to said VLC access point via a wireline communications link. In some embodiments, there is synchronization between a powerline communications time slot, a corresponding VLC downlink time slot, and a corresponding wireless radio uplink time slot.

Returning to step 516, in step 516 the UE device receives an assignment signal from said gateway scheduling a transmission on a wireless downlink radio channel corresponding to said gateway. In some embodiments, the received assignment signal from the gateway scheduling transmission on a downlink radio channel corresponding to said gateway is received on a wireless radio control channel. Operation proceeds from step 516 to step 518. In step 518, the UE device receives radio signals communicating traffic data on resources of said downlink radio channel identified by a received assignment signal. Operation proceeds from step 518 to step 520 in which the UE device transmits an acknowledgement signal corresponding to said downlink radio channel to said gateway.

Operation proceeds from steps 514 and 520 to step 508, where additional synchronization signal are detected.

Figure 6:
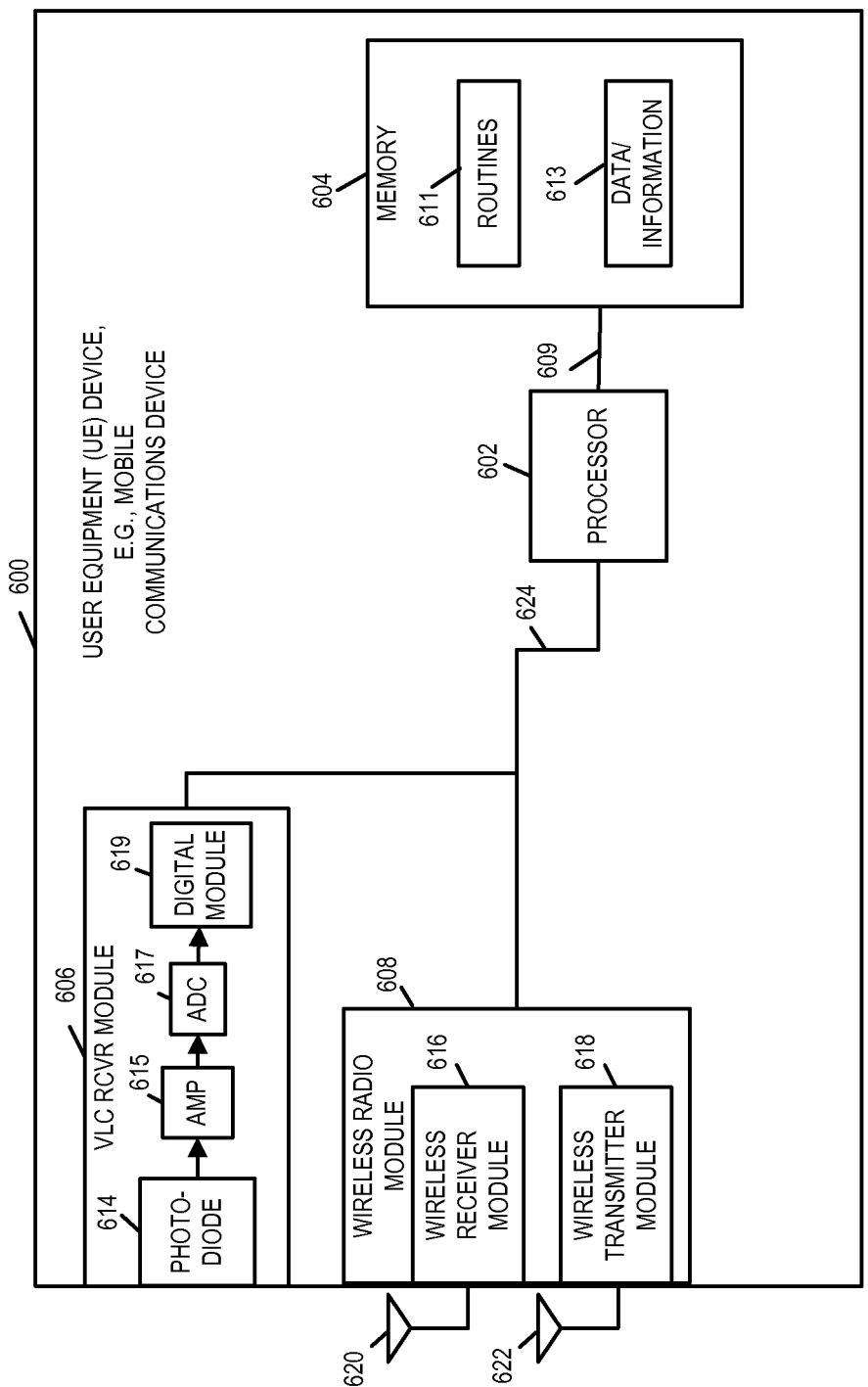
FIG. 6 is a drawing of an exemplary user equipment (UE) device in accordance with an exemplary embodiment.

FIG. 6 is a drawing of an exemplary user equipment (UE) device 600, e.g., a mobile wireless terminal, in accordance with an exemplary embodiment. The UE device 600 is, e.g., one of the UE devices (148, 150, 110, . . . , 152) of system 100 of FIG. 1. In some embodiments, UE device 600 implements a method in accordance with flowchart 500 of FIG. 5.

UE device 600 may, and sometimes does, implement a method in accordance with flowchart 500 of FIG. 5. UE device 600 includes a processor 602 and memory 604 coupled together via a bus 609 over which the various elements (602, 604) may interchange data and information. Memory 604 includes routines 611 and data/information 613. UE device 600 further includes a visible light communications (VLC) receiver module 606 and a wireless radio module 608. The VLC receiver module 606 and wireless radio module 608 are coupled to processor 602 via bus 624.

Light receiver module 606 includes a photodiode 614, an amplifier 615, an analog to digital converter (ADC) 617, and a digital module 619. Light signals detected by photodiode 614 are amplified by amplifier 615, and the amplified analog signal is processed by ADC 617 resulting in a digital signal communicating information which is received and processed by digital module 619. Received light signals include, e.g., a light beacon signal identifying a particular VLC access point, a light beacon signal communicating an identifier corresponding to a VLC access point, a light beacon signal communicating a pre-shared key (PSK), a light beacon signal communicating location information corresponding to a VLC access point, a light beacon signal communicating status information corresponding to a VLC access point, a light beacon signal communicating available capacity corresponding to a VLC access point, and downlink VLC traffic channel signals. In some embodiments, each VLC access point coupled to a gateway has a unique assigned identifier.

Wireless radio module 608 includes a wireless receiver module 616, e.g., an LTE receiver, coupled to receive antenna 620, via which UE device 600 receives downlink radio signals. The downlink radio signals include, e.g., synchronization signals, assignment signals corresponding to a VLC downlink channel, assignment signals corresponding to radio downlink channel, and downlink traffic channel data signals. Wireless radio module 608 further includes a wireless transmitter module 618, e.g., an LTE transmitter, coupled to transmit antenna 622, via which UE device 600 transmits uplink radio signals. In some embodiments, the same antenna is used for downlink and uplink. The uplink radio signals include, e.g., uplink traffic data signals, acknowledgement signals to received VLC channel downlink traffic signals from a VLC access point, and acknowledgement signals to received radio channel downlink traffic signals from the gateway.

In various embodiments, processor 602 is configured to detect a light signal from a visible light communications (VLC) access point, e.g., a light beacon signal communicating a VLC access point identifier, and transmit a radio signal to a gateway indicating that the UE device is in a visible light communications (VLC) coverage area in response to the detected light signal. In some embodiments, the visible light communications access point is an LED access point coupled to a gateway by a powerline communications link. In some embodiments, the visible light communications access point is an LED access point coupled to a gateway by an Ethernet communications link.

In some embodiments, processor 602 is configured to receive an assignment signal from said gateway scheduling a transmissions on a downlink light channel corresponding to said visible light communications access point. In some such embodiments, said received assignment signal from said gateway scheduling transmission on a downlink light channel corresponding to said visible light communications access point is received on a wireless radio control channel (e.g., via wireless receiver module 616).

In various embodiments, processor 602 is configured to receive an assignment signal from said gateway scheduling transmission on a wireless downlink radio channel via a wireless radio control channel (e.g., via wireless receiver module 616). In some such embodiments, processor 602 is further configured to receive synchronization signals used for synchronizing transmission time slots on both said downlink light channel and a radio channel.

In some embodiments, processor 602 is configured to: receive VLC signals communicating traffic data on resources of said downlink light channel identified by a received assignment signal (e.g., via VLC receiver module 606). In some such embodiments, processor 602 is further configured to transmit an acknowledgement signal, corresponding to said downlink light channel, to said gateway. In some such embodiments, processor 602 is further configured to transmit said acknowledgement signal on a radio uplink channel (e.g., via wireless transmitter module 618). In some such embodiments, the radio uplink channel is synchronized with said downlink light channel.

In various embodiments, the downlink light channel time slots are synchronized with wireline, e.g., powerline, communications time slots used to supply data to said visible light communications access point via a wireline, e.g., powerline, communications link.

Figure 7:
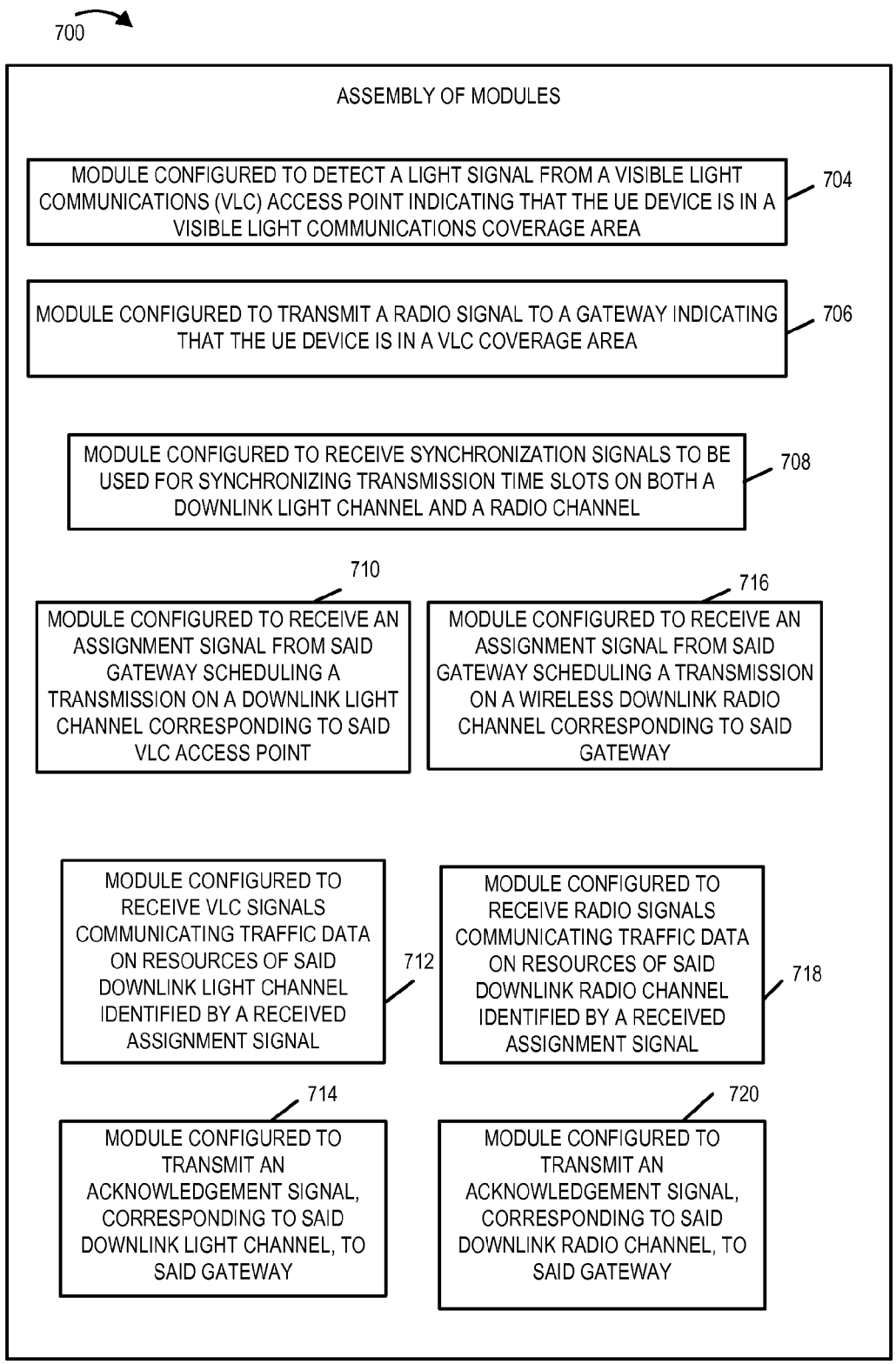
FIG. 7 is an assembly of modules which can, and in some embodiments is, used in the UE device illustrated in FIG. 6.

FIG. 7 is an assembly of modules 700 which can, and in some embodiments is, used in the UE device 600 illustrated in FIG. 6. The modules in the assembly 700 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. In some embodiments, some of the modules included in assembly of modules 700 are included within one or more of VLC receiver module 606 or wireless radio module 608. In various embodiments, one or more of VLC receiver module 606 or wireless radio module 608 is included within processor 602. As should be appreciated the level of integration of modules on the processor and or with some modules being external to the processor may be one of design choice. Alternatively, rather than being implemented as circuits, all or some of the modules may be implemented in software and stored in the memory 604 of UE device 600 shown in FIG. 6 with the modules controlling operation of the UE device 600 to implement the functions corresponding to the modules when the modules are executed by a processor, e.g., processor 602. In still other embodiments, various modules are implemented as a combination of hardware and software, e.g., with a circuit external to the processor 602 providing input to the processor 602 which then under software control operates to perform a portion of a module's function.

While shown in the FIG. 6 embodiment as a single processor 602, e.g., computer, within device 600, it should be appreciated that processor 602 may be implemented as one or more processors, e.g., computers. When implemented in software, the modules include code, which when executed by the processor, e.g., computer, to implement the function corresponding to the module. In some embodiments, processor 602 is configured to implement each of the modules of the assembly of modules 700. In embodiments where the assembly of modules 700 is stored in memory 604, and the memory 604 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the device 600 or elements therein such as the processor 602 to perform the functions of the corresponding steps illustrated and/or described in the method of flowchart 500 of FIG. 5.

FIG. 7 is an exemplary assembly of modules 700 in accordance with various embodiments. Assembly of modules 700 includes a module 704 configured to detect a light signal from a visible light communications (VLC) access point indicating that the UE device is in a visible light communications coverage area, a module 706 configured to transmit a radio signal to a gateway indicating that the UE device is in a VLC coverage area, a module 708 configured to receive synchronization signals to be used for synchronizing transmission time slots on both a downlink light channel and a radio channel. In various embodiments, the VLC access point is a LED access point coupled to a gateway by a powerline communications link. In some embodiments, the VLC access point is a LED access point coupled to a gateway by an Ethernet communications link. Assembly of modules 700 further includes a module 710 configured to receive an assignment signal from said gateway scheduling transmission on a downlink light channel corresponding to the VLC access point, a module 712 configured to receive VLC signals communicating traffic data on resources of said downlink light channel identified by an assignment signal, and a module 714 configured to transmit an acknowledgement signal, corresponding to said downlink light channel, to said gateway. Assembly of modules 700 further includes a module 716 configured to receive an assignment signal from said gateway scheduling a transmission of a wireless downlink radio channel corresponding to said gateway, a module 718 configured to receive radio signals communicating traffic data on resources of said downlink radio channel identified by a received assignment signal, and a module 720 configured to transmit an acknowledgement signal corresponding to said downlink radio channel to said gateway. In some embodiments, module 716 is configured to receive the assignment signal via a wireless radio control channel. In various embodiments, the acknowledgement signal, transmitted by module 720 is transmitted on a radio uplink channel that is synchronized with a downlink light channel. In various embodiments, downlink light channel time slots are synchronized with wireline, e.g, powerline, communications time slots used to supply data to said VLC access point via a wireline, e.g., powerline, communications link.

Figure 8:
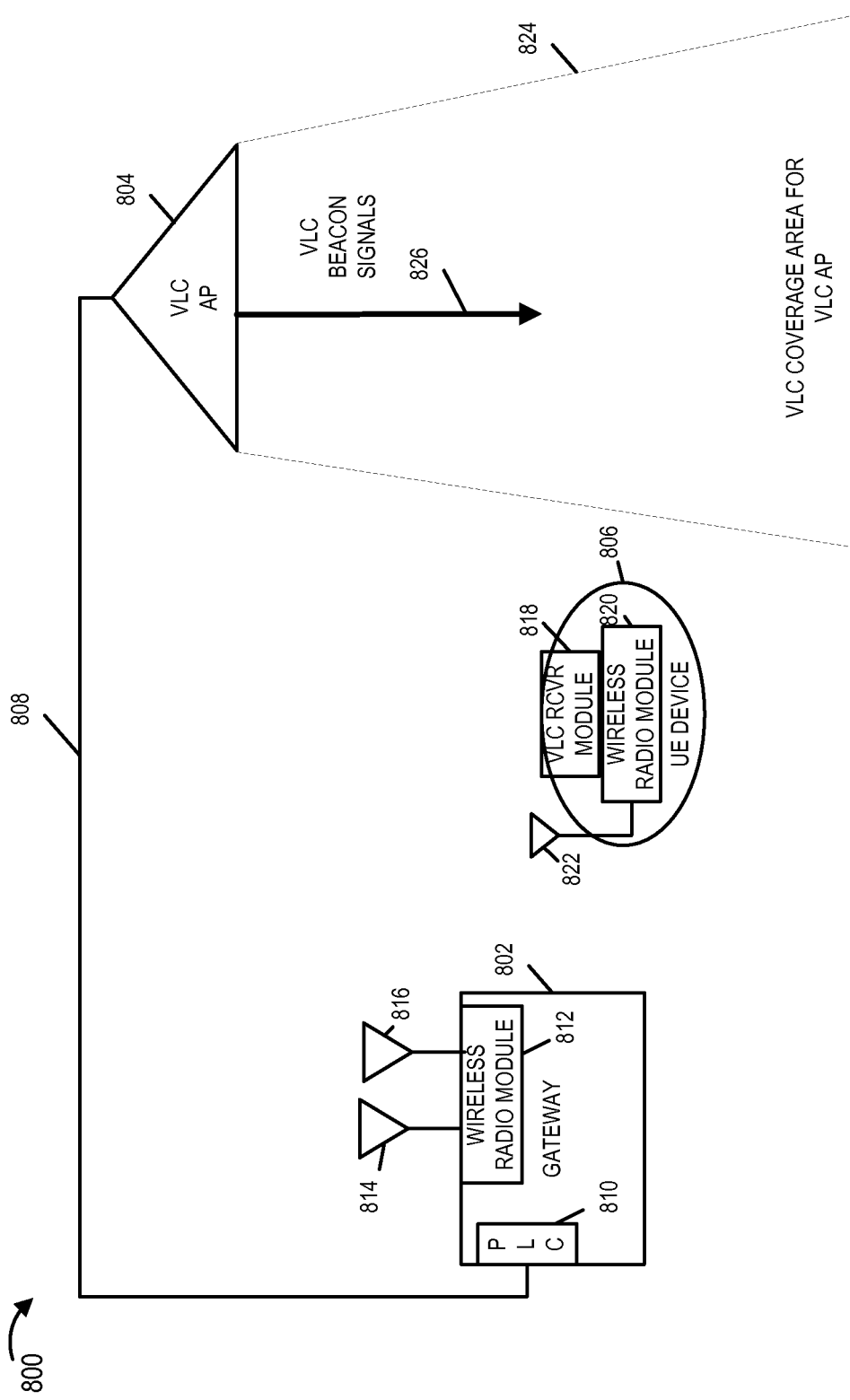
FIG. 8 illustrates an exemplary VLC access point transmitting VLC beacon signals into its VLC coverage area in accordance with an exemplary embodiment.

FIGS. 8-13 illustrate an example in which a gateway and a user equipment device communicate in accordance with an exemplary embodiment. Drawing 800 of FIG. 8 illustrates an exemplary gateway 802, an exemplary VLC access point 804, and an exemplary UE device 806. Gateway 802 includes a PLC module 810 and a wireless radio module 812. Gateway 802 also includes a receive antenna 814 coupled to a receiver, e.g., a LTE receiver, of wireless radio module 812 and a transmit antenna 816 coupled to a transmitter, e.g., an LTE transmitter, of wireless radio module 812. In some embodiments, the same antenna is used for the transmitter and receiver. PLC module 810 couples gateway 802 to powerline 808 which is connected to VLC AP 804. The VLC AP 804 has a corresponding VLC coverage area 824. Consider that the VLC coverage area 824 is within the wireless radio communications coverage area of gateway 802.

UE device 806 includes a VLC receiver module 818 including a photodiode, and a wireless radio module 820 including a receiver, e.g., an LTE receiver, and a transmitter, e.g., a LTE transmitter. Wireless radio module 820 is coupled to antenna 822.

In the example of FIG. 8, consider that UE device 806 has already established a wireless radio connection with gateway 802. VLC AP 804 is transmitting VLC beacon signals 826. However, UE device 806 is not located within VLC coverage area 824; therefore, UE device 806 does not detect VLC beacon signals 826.

Figure 9:
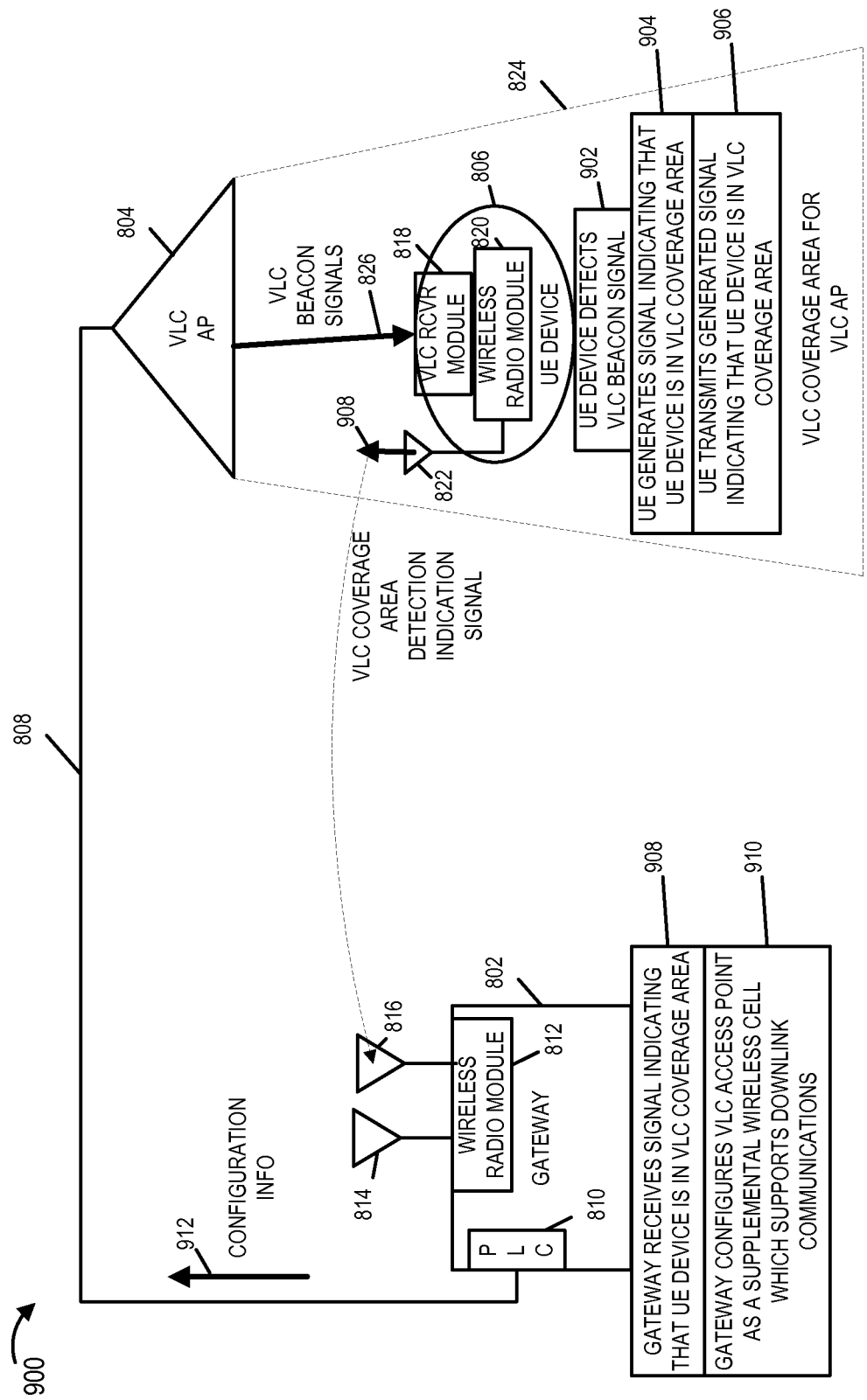
FIG. 9 illustrates an exemplary UE device, located in a VLC coverage area, detecting a VLC beacon signal, and transmitting a VLC coverage area detection indication signal to a gateway in response to the detected VLC beacon signals, and the gateway transmitting configuration information via powerline communications (PLC) signals to a VLC access point (AP) to configured the VLC AP for supplemental downlink communications support in accordance with an exemplary embodiment.

FIG. 9 is a continuation of the example of FIG. 8. Drawing 900 of FIG. 9 illustrates exemplary UE device 806, located in VLC coverage area 824, detecting a VLC beacon signal 826, and transmitting a VLC coverage area detection indication signal 908 to gateway 802 in response to the detected VLC beacon signal, and the gateway 802 transmitting configuration information 912 via PLC signals to VLC AP 804 to configure the VLC AP 804 for supplemental downlink communications support in accordance with an exemplary embodiment. Consider that UE device 806 has moved and is now situated within VLC coverage area 824. UE device 806 receives and detects beacon signals 826 via its VLC receiver module 818, as indicated by block 902. UE device 806 generates a signal indicating that the UE device is in the VLC coverage area, as indicated by block 904. UE device 806 transmits the generated signal 908 indicating that the UE device is in the VLC coverage area, as indicated by block 906. The VLC coverage area detection indication signal 908 is received and recovered by the gateway 802 via its receive antenna 816 and wireless radio receiver of its wireless radio module 812, as indicated by block 908. The gateway configures the VLC access point as supplemental wireless cell which supports downlink communications, as indicated by block 910. As part of configuring the VLC access point 804, the gateway generates and transmits configuration information 912 included in PLC signals to gateway 802 via its PLC modules 810. VLC AP 804 receives the configuration information 912 and configures to serves as a supplemental wireless cell which supports downlink communications to UE device 806 via VLC signals.

Figure 10:
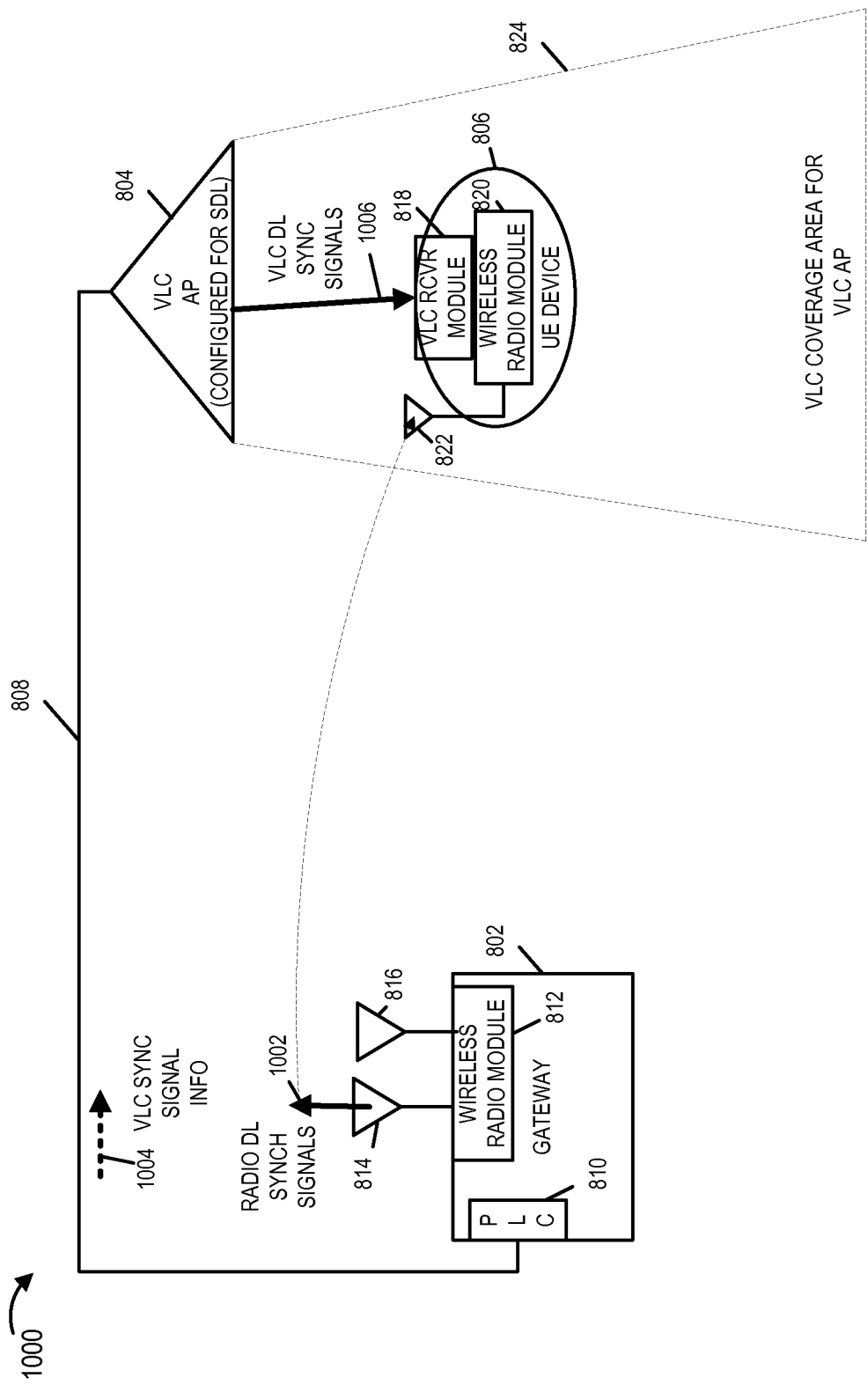
FIG. 10 illustrates exemplary VLC downlink synchronizations signals and exemplary radio downlink synchronization signals being received by a UE device in accordance with an exemplary embodiment.

Continuing with the example, in drawing 1000 of FIG. 10, the VLC AP 804 is configured for supplemental downlink. FIG. 10 illustrates exemplary VLC downlink synchronizations signals and exemplary radio downlink synchronization signals being received by UE device 806 in accordance with an exemplary embodiment.

In some embodiments, gateway 802 generates and transmits PLC signals 1004 communicating VLC synchronization signal information to VLC access point 804 via PLC wireline link 808. In some such embodiments, the VLC access point 804 uses the received VLC synchronization signal information 1004 to generate VLC DL synchronization signals 1006, which the VLC AP 804 transmits into its VLC coverage area 824. In some embodiments, VLC AP 804 generates and transmits VLC synchronization signals 1006 at specific points in time in a timing structure which is synchronized the AC power signal, e.g., there is a predetermined offset between the start of an AC power cycle and the start of a beacon time interval. In various embodiments, there is an integer number of AC power cycles in a beacon time interval. VLC AP 804 generates and transmits VLC Downlink synchronization signals 1006 to UE device 806 which are received and used by UE device 806 to synchronize VLC communications.

Gateway device 802 also generates and transmits radio downlink synchronization signals 1002 via the wireless radio transmitter of wireless radio module 812 and transmit antenna 814. The transmitted radio DL synchronization signals 1002 are received by antenna 822 and the wireless receiver of wireless radio module 820. The recovered radio downlink synchronization signals 1002 are used by UE device 806 to synchronize radio communications.

Figure 11:
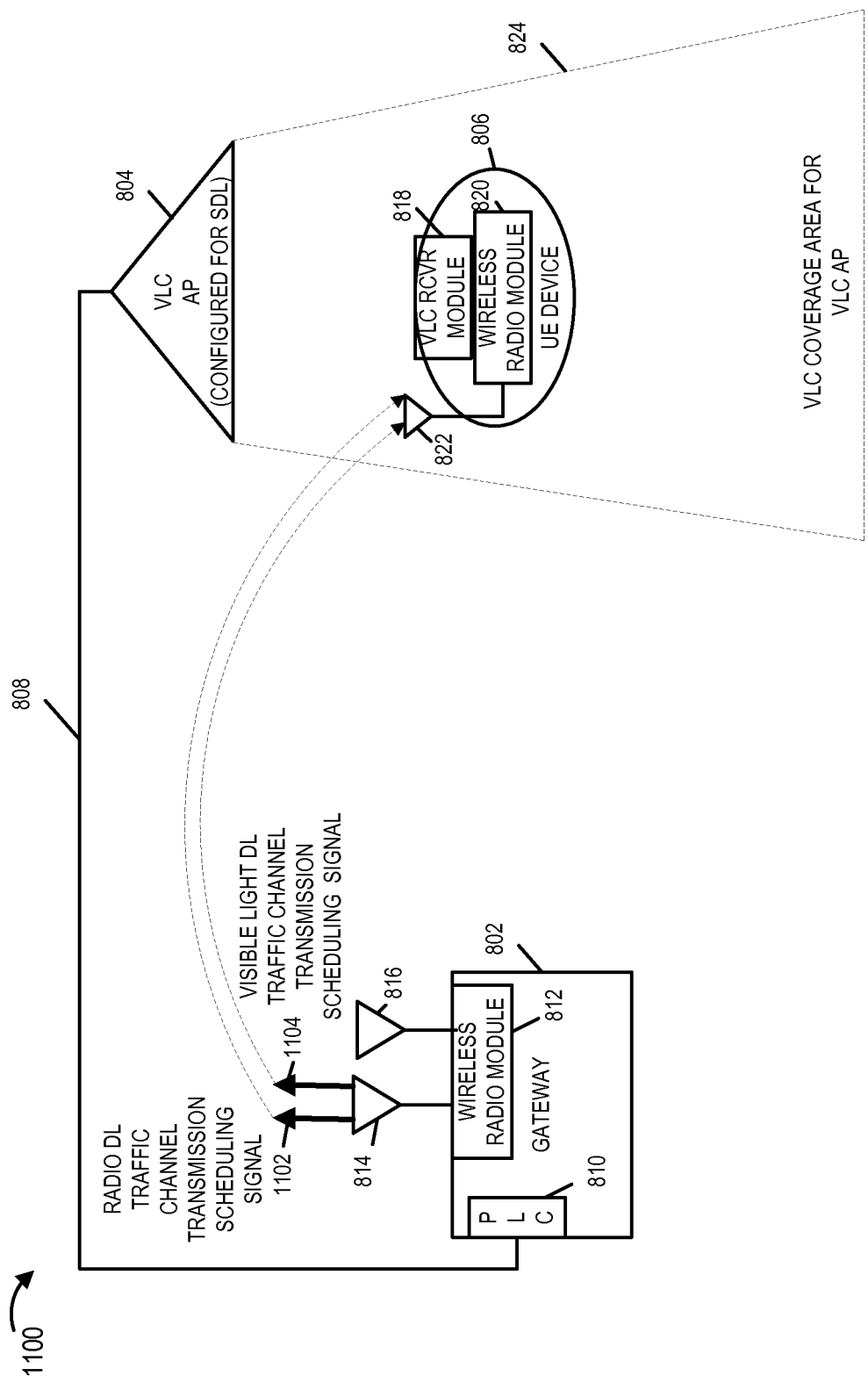
FIG. 11 illustrates radio downlink traffic channel transmission scheduling signals and VLC downlink traffic channel transmission scheduling signaling, via radio signals, in accordance with an exemplary embodiment.

Drawing 1100 of FIG. 11 illustrates an exemplary radio downlink traffic channel transmission scheduling signal 1102 and a VLC downlink traffic channel transmission scheduling signal 1104, which are transmitted from the gateway 802 to the UE device 806 via a downlink control channel in accordance with an exemplary embodiment. In particular, gateway 802 schedules VLC downlink traffic channel resources and wireless radio downlink traffic channel resource to UE device 806. UE device 806, is, e.g., one of a plurality of UE devices being scheduled by gateway 802. Some UE devices may be situated within a VLC AP coverage area, as is UE device 806, while other devices may be outside a VLC access point coverage area, but within the radio communications coverage area of the gateway. In this example, at this time gateway 802 decides to schedule UE device 806 on both DL VLC traffic channel resources and DL radio traffic channel resources. Gateway 802 generates and transmits radio DL traffic channel transmission scheduling signal 1102 conveying an assignment of radio downlink traffic channel resource in which UE device 806 is to receive downlink traffic channel signals from gateway 802. Gateway 802 also generates VLC DL traffic channel transmission scheduling signal 1104 conveying an assignment of VLC traffic channel resources in which UE device 806 is to receive downlink VLC traffic signals from VLC AP 804 conveying downlink traffic channel signals from gateway 802. UE device 806 receives, via antenna 822 and its wireless receiver module in wireless radio module 820, the assignment signals 1102 and 1104 and recovers the assignment information being communicated. In some embodiments, the assignment for both downlink radio traffic channel resources and downlink VLC traffic channel resources are communicated in the same assignment signal.

Figure 12:
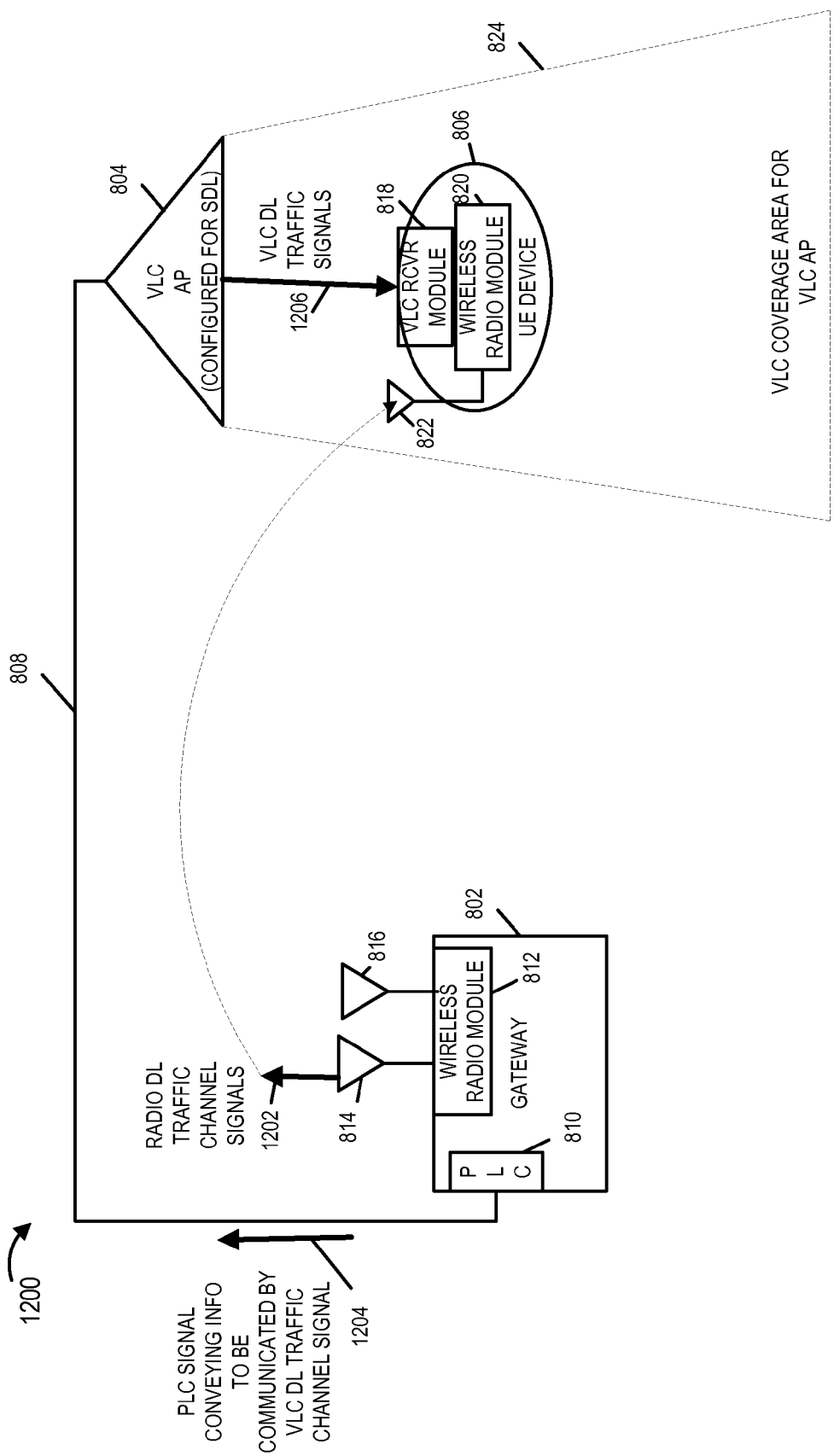
FIG. 12 illustrates the communication of traffic signals from a gateway to a UE device by radio signals and by PLC signals converted into VLC signals in accordance with an exemplary embodiment.

Drawing 1200 of FIG. 12 illustrates the communication of first traffic signal information from gateway 802 to UE device 806 by radio downlink traffic channels signals 1202. Gateway 802 generates and transmits radio downlink traffic channel signals 1202 via its wireless transmitter of wireless radio module 812 and transmit antenna 814. The transmitted radio DL traffic channel signals 1202 are received and recovered by UE device 806 via its antenna 822 and wireless radio receiver of wireless radio module 820. Drawing 1200 of FIG. 12 further illustrates the communication of second traffic signal information from gateway 802 to UE device 806 via PLC signals 1204 and VLC signals 1206. Gateway 802 generates and transmits, via PLC module 810, PLC signals 1204 conveying information to be communicated by VLC DL traffic channel signals. Transmitted PLC signals 1204 are received and recovered by VLC AP 804, which generates and transmits VLC DL traffic channel signals 1206. The transmitted VLC DL traffic channel signals 1206 are received and recovered by UE device 806 via a photodiode of its VLC receiver module. The downlink radio traffic channel resources on which signals 1202 were conveyed were identified by information communicated via assignment signal 1102; the downlink VLC traffic channel resources on which signals 1206 were conveyed were identified by information communicated via assignment signal 1104.

Figure 13:
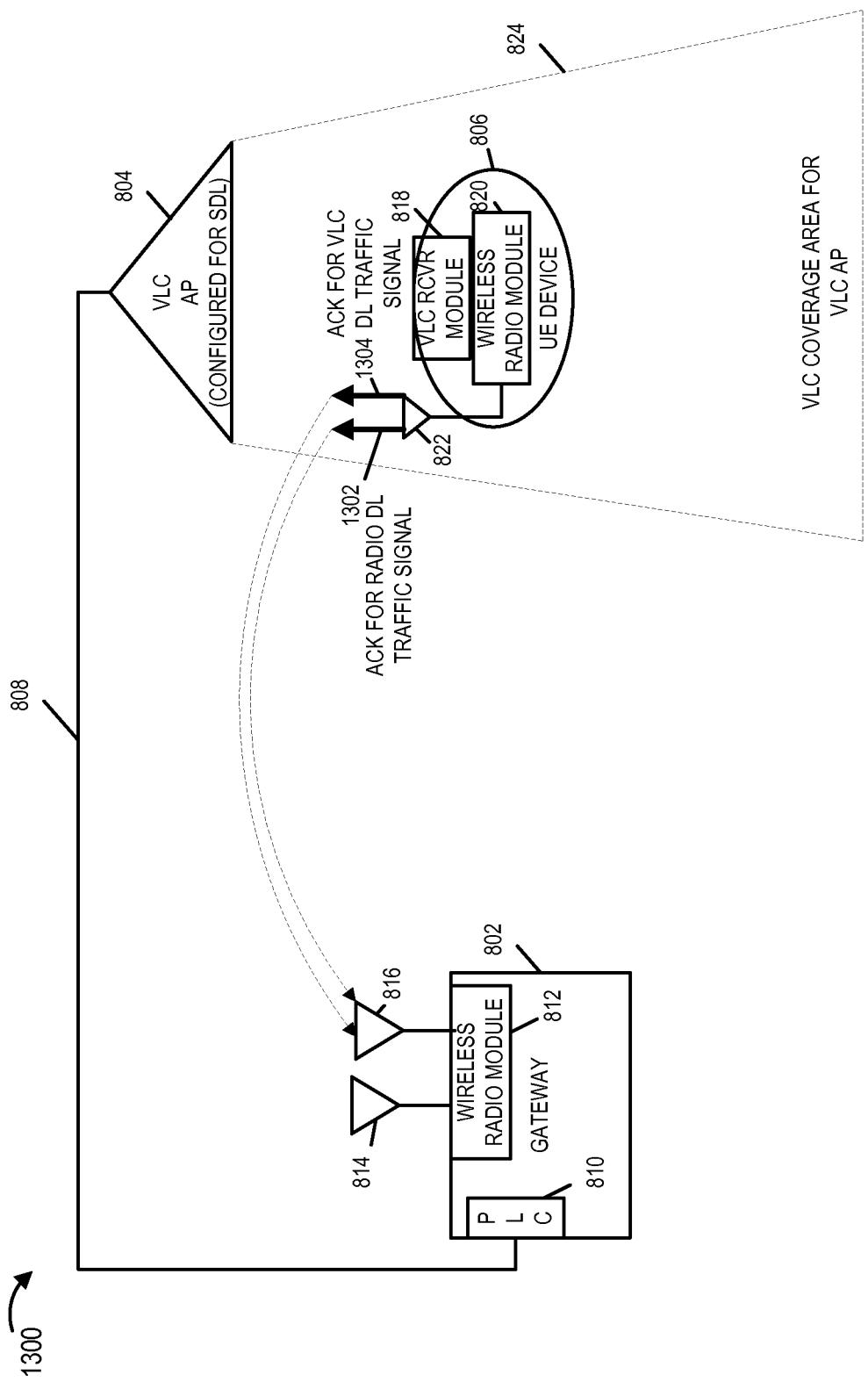
FIG. 13 illustrates an acknowledgment signal, corresponding to both radio downlink traffic channel signals and VLC downlink traffic channels signals being conveyed from a UE device to a gateway via a wireless radio uplink in accordance with an exemplary embodiment.

Drawing 1300 of FIG. 13 illustrates acknowledgment signals, corresponding to both radio downlink traffic channel signals and VLC downlink traffic channels signals being conveyed from UE device 806 to gateway 802 via a wireless radio uplink in accordance with an exemplary embodiment. In particular, UE device 806 generates and transmits ACK signal 1302 in response to downlink traffic radio signals 1202. UE device 806 generates and transmits ACK signal 1304 in response to downlink VLC traffic signals 1206. The acknowledgment signals (1302, 1304) are received and recovered by gateway 802 via it receive antenna 816 and receiver module included in wireless radio module 812. In various embodiments, there is a predetermined relationship, between an acknowledgment signal and a downlink traffic channel resource. In some such embodiments, there is no need to communicate identification information, e.g., device identification information in the acknowledgment signals. In some embodiments, a recurring VLC downlink timing structure is synchronized to an uplink wireless radio recurring timing structure.

Figure 14:
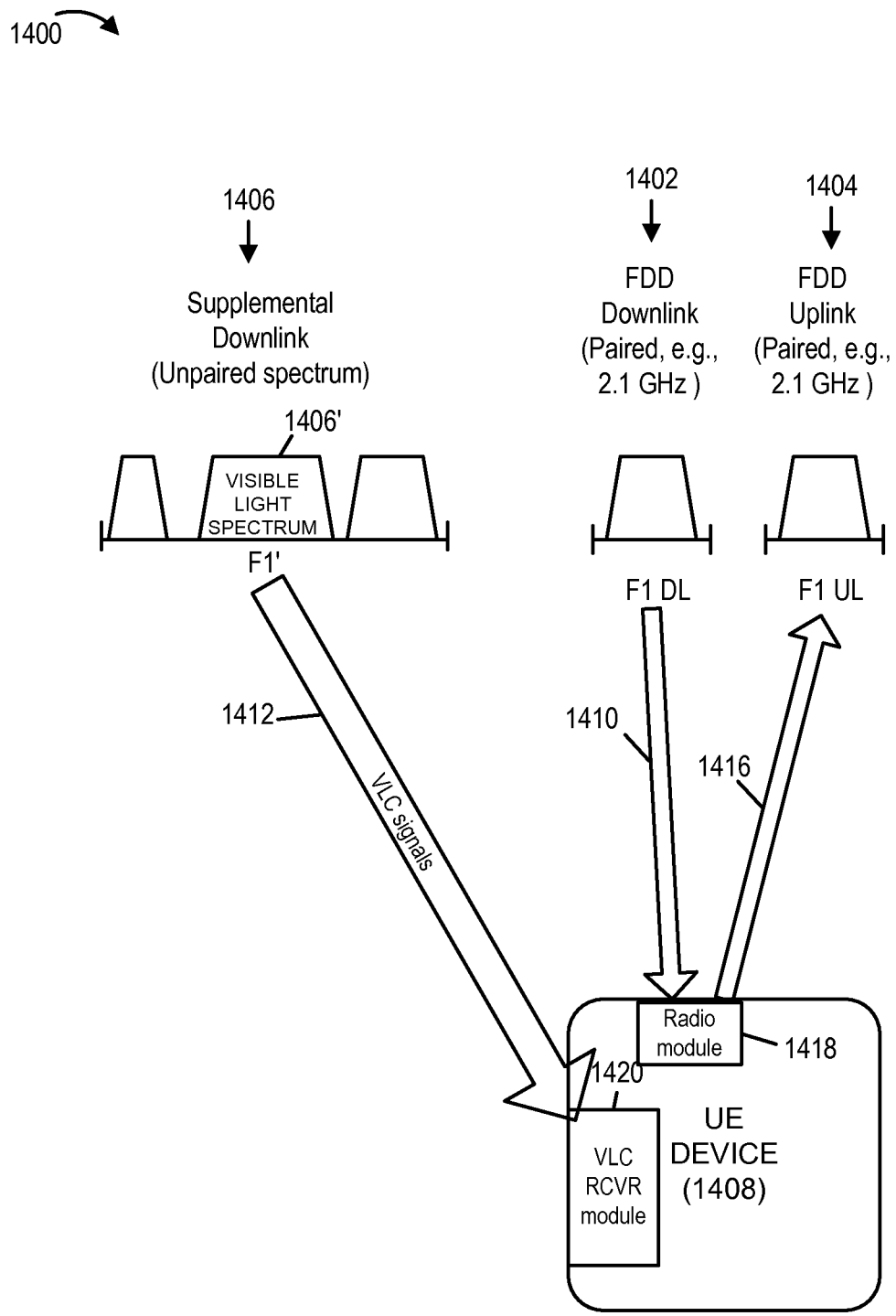
FIG. 14 illustrates the use of the visible light spectrum for supplemental downlink in accordance with an exemplary embodiment.

Various aspects and/or features of some embodiments are further described below. Drawing 1400 of FIG. 14 illustrates the use of supplemental downlink. In the example of FIG. 14, there is an FDD downlink spectrum 1402, an FDD uplink spectrum 1404 and supplemental downlink spectrum 1406 which includes three alternative spectrums including a visible light spectrum 1406'. The FDD downlink 1402 and FDD uplink 1404 are, e.g., paired 2.1 GHz spectrum. The supplemental downlink 1406 is, e.g., one or more of unpaired spectrum. In this example, the supplemental downlink is visible light spectrum 1406'. In some embodiments, the unpaired spectrum is used only for downlink whereas the paired spectrum is used for both downlink and uplink.

In the example, of FIG. 14, downlink signals 1410 communicated on the FDD downlink 1402 are communicated via wireless radio signals, e.g., from a gateway device to UE device 1408, where the downlink radio signals 1410 are received by wireless radio module 1418. Downlink signals 1412 communicated on the supplemental downlink 1406' are communicated via visible light communications signals, e.g., from a visible light access point coupled to the gateway via a powerline communications link. Downlink signals 1412 are received by VLC receiver module 1420. Uplink signals 1416 (wireless radio signals), communicated on the FDD uplink 1404, are transmitted by wireless radio module 1418, using FDD uplink 1404, to the gateway.

Light Emitting Diodes (LEDs) capable of generating white light are projected to become the dominant source of lighting in the commercial and residential sectors in the future. Recent research has demonstrated that such LEDs can be intensity modulated at a high bandwidth. When combined with the high optical power intensities (tens of Watts) in typical indoor lighting conditions, the high modulation rate offers the potential for broadband wireless data communication in the hundreds of Mbps. One of the key challenges with Visible Light Communication (VLC) however, is the absence of a reverse link (or uplink). Various method and apparatus are directed to using Visible Light Communication (VLC) in combination with the supplemental downlink concept, e.g., in LTE.

Figure 15:
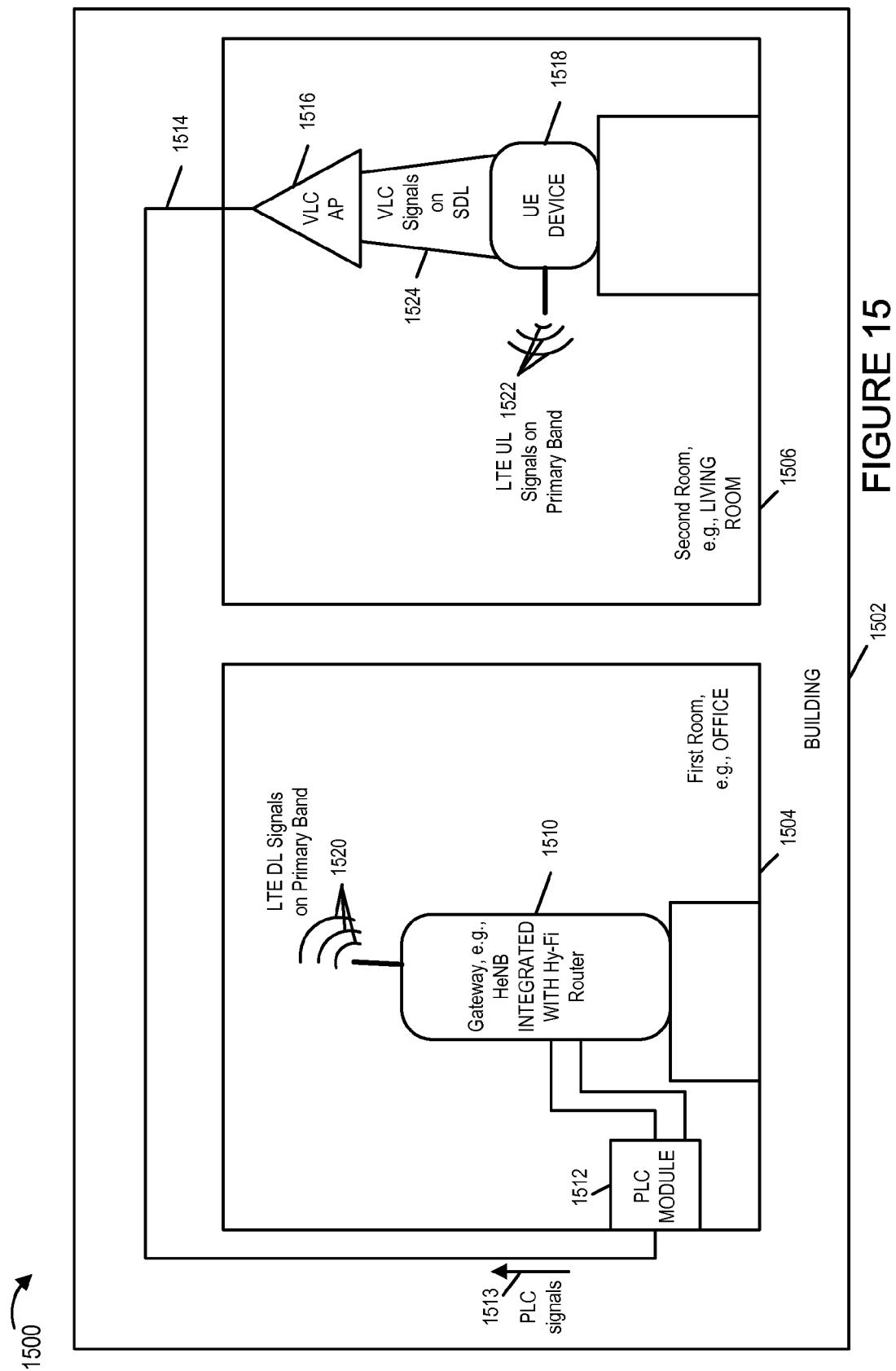
FIG. 15 illustrates an exemplary system in which the visible light spectrum is used for a supplemental downlink in addition to a wireless radio downlink and a wireless radio uplink.

In some embodiments, the visible spectrum 1406' is used as a supplemental downlink carrier. FIG. 15 illustrates an exemplary system 1500 in which the visible light spectrum is used a supplemental downlink in addition to a wireless radio downlink and a wireless radio uplink. Exemplary system 1500 includes a building 1502 including a first room 1504, e.g., an office, and a second room 1506, e.g., a living room 1506. The second room is adjacent the first room. First room 1504 includes a gateway 1510, e.g., a home gateway including a LTE HeNB (e.g., wireless base station), which supports power line communication in addition to wireless communications. Gateway 1510 can, and sometimes does, transmit data over the power line, e.g., via PLC module 1512.

Second room 1506 includes a VLC access point 1516, which is coupled to PLC module 1512, via a powerline wirelink 1514. VLC access point 1516 includes a powerline communications (PLC) receiver embedded inside a light emitting diode (LED) lamp module. A visible light communications (VLC) transmitter is also embedded inside the LED lamp module. VLC signals 1524 of the supplement downlink are transmitted by the VLP access point 1516.

UE device 1518, located in the light coverage area of VLC access point 1516 can receive and decode both LTE signals 1520 and VLC signals 1524 and transmit signals 1522 on the LTE uplink spectrum.

The supplemental downlink (SDL) operation is controlled by the gateway 1510, e.g., a HeNB integrated into the Hy-Fi router. The steps for connection setup are as follows. The UE device 1518 establishes a connection with the gateway, e.g., HeNB, via radio signaling, e.g. LTE signaling including security activation. This setup establishes a radio resource control channel (RRC) between the gateway 1510 and UE 1518.

The UE detects a VLC signal, e.g., a light beacon signal from VLC AP 1516, or VLC signals, e.g., VLC downlink pilot signals from VLC AP 1516. The UE device 1518 informs the LTE system, via a radio signal to gateway 1510, that it is under VLC downlink coverage. The UE is able to determine this because it is listening to the VLC light beacon signal and/or VLC downlink pilots transmitted by the LED access point.

Once the VLC service is discovered by the UE device 1518 and the gateway 1510 has been notified, the gateway 1510 configures the VLC access point 1516, e.g., an LED AP, as an LTE SCell.

Once the connection is set up, the gateway 1510, e.g. HeNB, can, and sometimes does, schedule downlink channels on the VLC carrier. In addition to the HS-PDSCH channel, the SDL carrier carries the control channel HS-SCCH and the Primary Common Pilot Channel (P-CPICH). The uplink traffic from the UE 1518 to gateway 1510 is communicated over the LTE uplink band. The paired LTE downlink band still would carry the PCCPCH and the synchronization channel SCH overhead.

Figure 16:
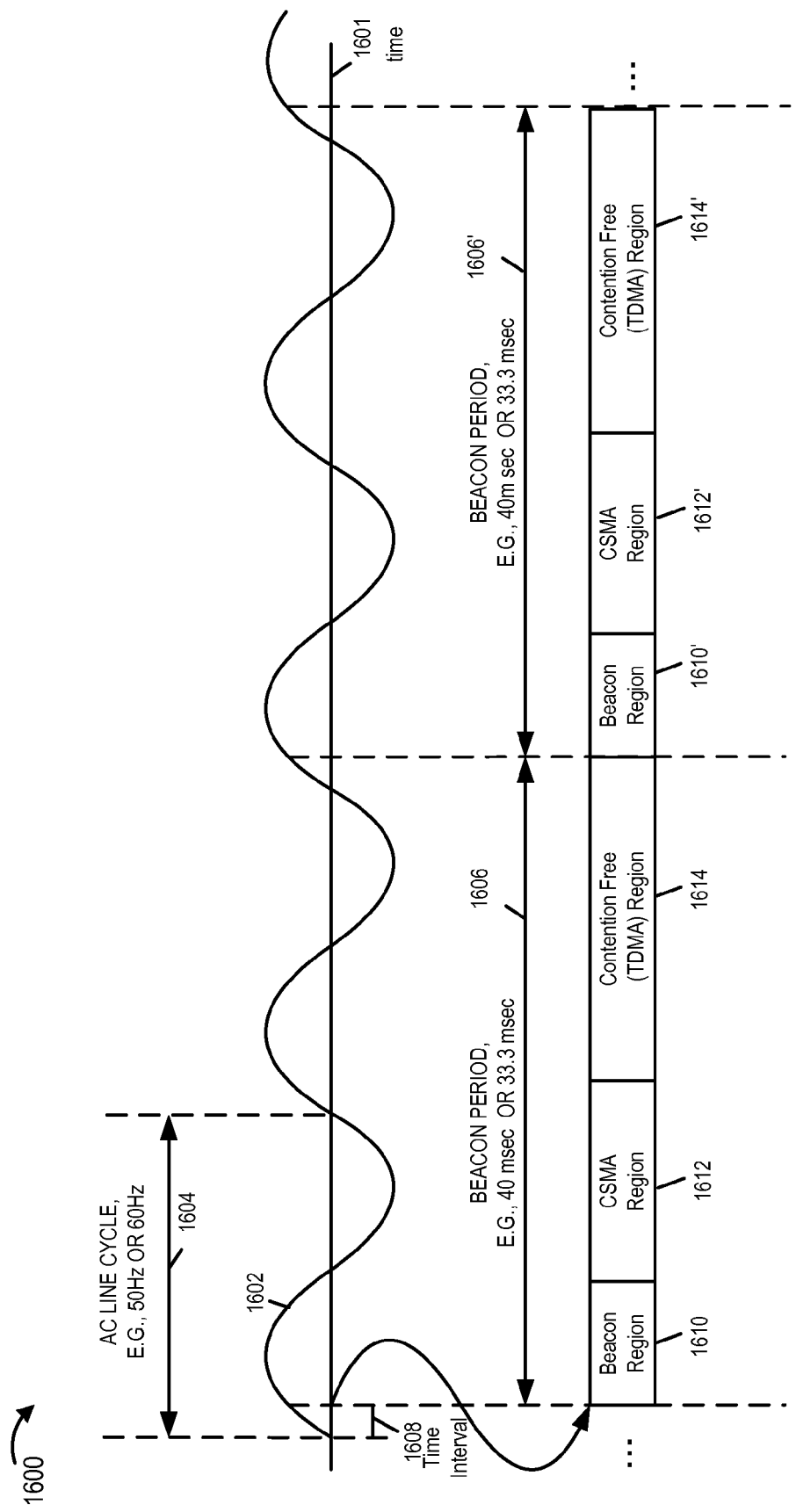
FIG. 16 illustrates an exemplary AC power line signal and a relationship to recurring beacon time periods in accordance with an exemplary embodiment.

It is advantageous for the VLC downlink transmissions to be synchronized with the LTE uplink channels. One of the key issues here is the synchronization between the uplink and downlink channels. In some embodiments, using the Time Division Multiple Access (TDMA) feature of the PLC (powerline) communication protocol is used for synchronization. The gateway 1510, e.g., a Hy-Fi gateway, in some embodiments, assigns higher QoS to UEs participating in LTE SDL, e.g., to UEs using the VLC SDL. The effect of this is that those UEs can use deterministic, contention-free slots of the PLC communication protocol. The gateway 1510, e.g., Hy-Fi router, can obtain timing signals from the integrated HeNB to determine TDMA slot assignment time instants for the UEs operating in SDL mode using the VLC SDL. An exemplary timeline of the PLC protocol is shown in drawing 1600 of FIG. 16. Horizontal axis 1601 represents time. An exemplary power line signal 1602 is shown with an AC line cycle 1604, which is either 50 Hz or 60 Hz depending upon the particular application. There is a time interval 1608, between the start of AC line cycle and the start of a beacon period. In various embodiments, the time interval 1608 is fixed and predetermined. In various embodiments, the time interval 1608 corresponds to a line cycle phase shift. The beacon period is, e.g., 40 msec in the case of a 50 Hz AC line cycle or approximately 33.3 msec in the case of a 60 Hz AC line cycle. Two exemplary iterations of a beacon period (1606, 1606') are shown. First beacon period 1606 includes a beacon region 1610, a Carrier Sense Multiple Access With Collision detection (CSMA) region 1612 and a Contention free Time Division Multiple Access (TDMA) region 1614. Second beacon period 1606' includes a beacon region 1610', a CSMA region 1612' and a Contention free TDMA region 1614'. In some embodiments, when a UE device is assigned downlink traffic channel VLC resources, the UE is assigned contention free resources in a contention free TDMA region. In some embodiments, contention free VLC downlink resources in a contention free TDMA region include a plurality of contention free slots. In various embodiments, a contention free wireless radio uplink resource for communicating an acknowledgment signal corresponds to a contention free downlink VLC downlink traffic channel region, e.g., in accordance with a predetermined mapping. For example, a particular contention free downlink traffic channel VLC slot corresponds to a contention free wireless radio uplink resource, e.g., in accordance with a predetermined mapping. In some such embodiments, an uplink wireless radio acknowledgment signal, corresponding to the downlink VLC traffic signal, does not need to, and does not, include an identifier.

Figure 17:
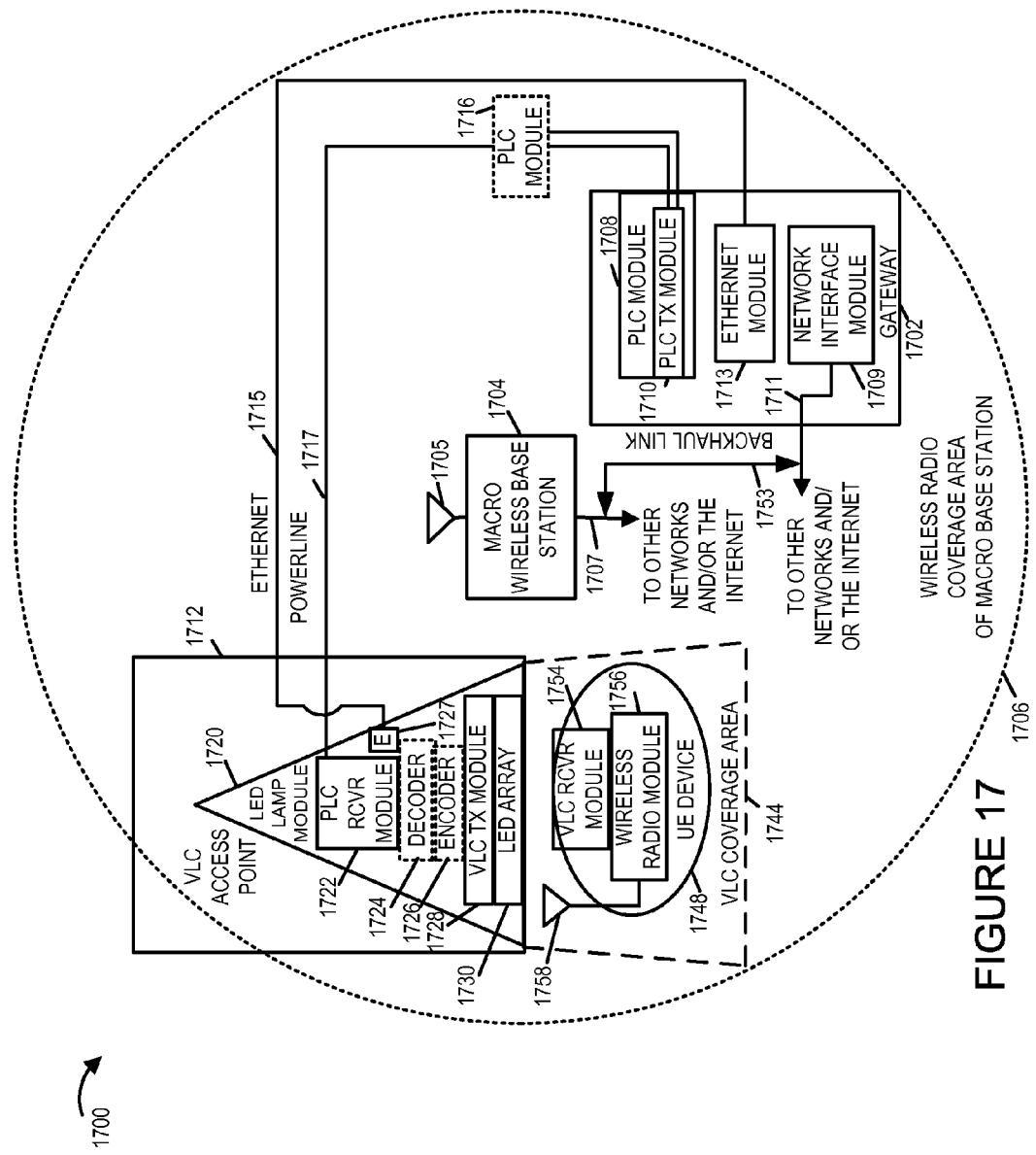
FIG. 17 is a drawing of an exemplary communications system in accordance with various embodiments.

FIG. 17 is a drawing of an exemplary communications system 1700 in accordance with various embodiments. Exemplary communications system 1700 includes a gateway 1702, a macro base station 1704 and one or more visible light communications access points such as exemplary visible light communications (VLC) access point 1712. Exemplary communications system 1700 further includes a plurality of user equipment devices such as exemplary user equipment (UE) device 1748, e.g., a mobile device which may move throughout the system 1700.

Macro base station 1704, e.g., a cellular base station, includes a wireless transmitter, a wireless receiver and one or more antennas, e.g., corresponding antenna 1705, for transmitting and receiving wireless signals to UE devices. Macro base station 1704 has a corresponding wireless radio coverage area 1706. Macro base station 1704 further includes a network interface module which couples the macro base station 1704 to other networks and/or the Internet via link 1707. Gateway 1702 includes a powerline communications (PLC) module 1708 including a PLC transmitter module 1710. Gateway 1702 is coupled to a powerline 1717 via PLC module 1716, e.g., a powerline interface module. In some embodiments, PLC module 1716 is not included and PLC module 1708 is coupled directly to the powerline 1717. VLC access point 1712 includes a light emitting diode (LED) lamp module 1720. LED lamp module 1720 includes a PLC receiver module 1722, a VLC transmitter module 1728 and an LED array 1730. In some embodiments, LED lamp module 1720 further includes a decoder module 1724 and an encoder module 1726. VLC access point 1712 has a corresponding VLC coverage area 1744. VLC coverage area 1744 is located within wireless radio coverage area 1706.

Gateway 1702 further includes a network interface module 1709 which couples the gateway 1702 to other networks and/or the Internet via link 1711. Backhaul link 1753 couples the network interface of the macro base station 1704 to the network interface of the gateway 1702. In some embodiments, gateway 1702 receives content from other networks and/or the Internet and/or macro base station 1704 via link 1711 and network interface module 1709. In some such embodiments, gateway 1702 then the forwards at least some of the received content to VLC access point 1712. VLC access point 1712, then transmits the content to one or more UE devices, e.g., to UE device 1748, which is located within its VLC coverage area.

UE device 1748 includes a VLC receiver module 1754 and a wireless radio module 1756. Wireless radio module 1756 is coupled to antenna 1758.

PLC transmitter module 1710 of gateway 1702 is coupled to PLC receiver module 1722 of LED lamp module 1720 of VLC access point 1712 via PLC module 1716 and a powerline 1717. Powerline 1717 serves as a communications link and is therefore sometimes referred to a powerline link.

In some embodiments, at least some different VLC access points correspond to different rooms in a building. In some embodiments, at least some different VLC access points correspond to different portions of the same room in a building.

In the example of FIG. 17, UE device 1748 is within the wireless radio coverage area 1706 of macro base station 1704. UE device 1748 may receive downlink radio signals from macro wireless base station 1704 and transmit wireless radio uplink signals to macro base station 1704. Continuing with the example, UE device 1748, which is located within the VLC coverage area 1744, may receive downlink VLC signals from VLC access point 1712 communicating information from gateway 1702. In some embodiments, the information conveyed via the downlink VLC signals was communicated between gateway 1702 and VLC access point 1712 via PLC module 1716 and powerline 1717 prior to VLC communication of the information to UE device 1748. In some embodiments, communication between gateway 1702 and VLC access point 1 1712 is by way of PLC module 1716 and powerline 1717. In some embodiments, e.g., some embodiments, in which decoder 1724 and encoder 1726 are not included, the gateway 1702 transmits powerline communications signals which control, e.g., directly, the LED array 1730 output to produce VLC communications signals. In some embodiments, e.g., some embodiments, in which decoder 1724 and encoder 1726 are included, the gateway 1702 transmits powerline communications signals which are decoded by decoder module 1724 and encoded by encoder module 1726 to generate VLC communications signals.

Exemplary VLC signals transmitted by VLC access point 1712 and received by VLC receiver module 1754 of UE device 1748 include a light beacon signal, VLC synchronizations signals and downlink VLC traffic signals. In various embodiments, VLC receiver module 1754 includes a photodiode. Exemplary downlink signals transmitted by macro wireless base station 1704 via antenna 1705 and received by wireless radio module 1756 of UE device 1748 via antenna 1758 include synchronization signals, light channel transmission scheduling signals, radio channel transmission scheduling signals, and downlink radio traffic signals. Exemplary uplink signals transmitted by wireless radio module 1756 of UE device 1748 via antenna 1758 and received by macro wireless base station 1704 via antenna 1705 include uplink traffic signals, acknowledgment signals corresponding to downlink light channel signals, and acknowledgment signals corresponding to downlink radio channel signals.

In some embodiments, a VLC downlink is a supplemental downlink corresponding to a radio FDD downlink and radio FDD uplink pair. In various embodiments, downlink light channel time slots are synchronized with powerline communications time slots used to supply data to a VLC access point via a wireline, e.g., powerline, communications link.

In some embodiments, the gateway 1702 includes an Ethernet module 1713, and LED lamp module 1720 of the VLC access point 1712 also includes an Ethernet module 1727 which is coupled together via Ethernet 1715. In some such embodiments, the Ethernet 1715 is used for communications between the gateway 1702 and the VLC access points 1712 instead of the powerline 1717. In some such embodiments, various signals, described above as being communicated over the powerline 1717 are instead communicated over the Ethernet 1715. Thus, in some embodiments, the information conveyed via the downlink VLC signals was communicated between gateway 1702 and VLC access point 1712 via Ethernet 1715, prior to VLC communication of the information to UE device 1748. Thus, in some embodiments, communication between gateway 1702 and VLC access point 1712 is by way Ethernet 1715.

In some embodiments, a first portion of the VLC access points coupled to gateway 1702 communicate with the gateway 1702 via powerline 1717 and a second portion of the VLC access points coupled to gateway 1702 communicate with the gateway 1702 via Ethernet 1715.

Figure 18:
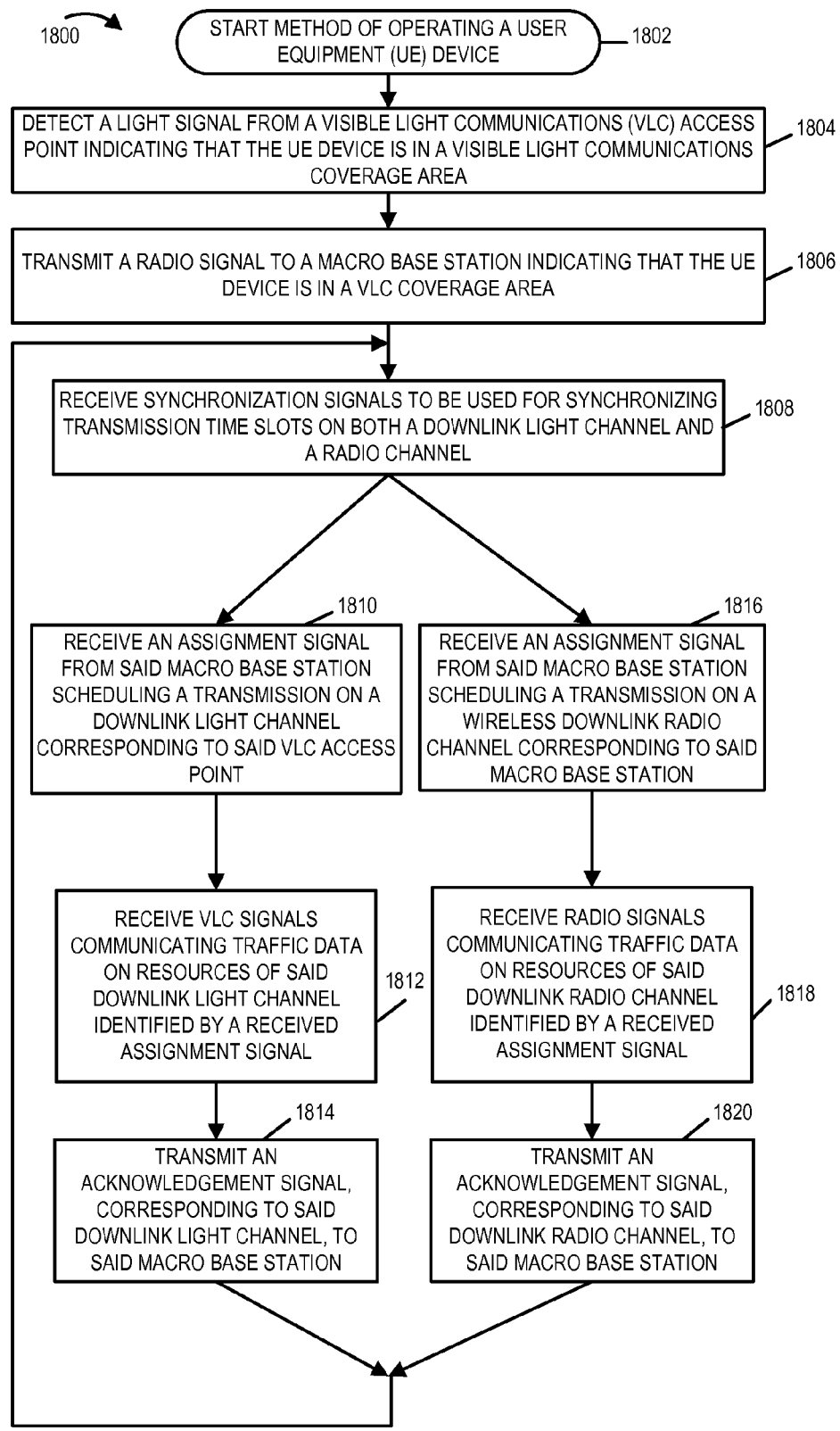
FIG. 18 is a flowchart of an exemplary method of operating a user equipment (UE) device in accordance with an exemplary embodiment.

FIG. 18 is a flowchart 1800 of an exemplary method of operating a user equipment (UE) device, e.g., a mobile wireless terminal, in accordance with an exemplary embodiment. The UE device implementing the method of flowchart 1800 is, e.g., UE device 1748 of system 1700 of FIG. 17. Operation of the method starts in step 1802, where the UE device is powered on and initialized. Operation proceeds from step 1802 to step 1804.

In step 1804, the UE device detects a light signal from a visible light communications (VLC) access point indicating that the UE device is in a visible light communications coverage area. In some embodiments, the VLC access point is a LED access point coupled to a gateway by a powerline communications link. In some embodiments, the VLC access point is a LED access point coupled to a gateway by an Ethernet communications link. Operation proceeds from step 1804 to step 1806.

In step 1806, the UE device transmits a radio signal to a macro base station indicating that the UE device is in a VLC coverage area. Operation proceeds from step 1806 to step 1808.

In step 1808, the UE device receives synchronization signals to be used for synchronizing transmission time slots on both a downlink light channel and a radio channel. Operation proceeds from step 1808 to steps 1810 and 1816.

In step 1810, the UE device receives an assignment signal from said macro base station scheduling a transmission on a downlink light channel corresponding to said VLC access point. In some embodiments, the received assignment signal from the macro base station scheduling transmission on a downlink light channel corresponding to said VLC access point is received on a wireless radio control channel. Operation proceeds from step 1810 to step 1812. In step 1812, the UE device receives VLC signals communicating traffic data on resources of said downlink light channel identified by a received assignment signal. Operation proceeds from step 1812 to step 1814, in which the UE device transmits an acknowledgment signal corresponding to said downlink light channel to said macro base station. In various embodiments, the acknowledgment signal transmitted in step 1814 is transmitted on a radio uplink channel that is synchronized with said downlink light channel. In some embodiments, downlink light channel time slots are synchronized with wireline, e.g., powerline, communications time slots used to supply data to said VLC access point via a wireline communications link. In some embodiments, there is synchronization between a powerline communications time slot, a corresponding VLC downlink time slot, and a corresponding wireless radio uplink time slot.

Returning to step 1816, in step 1816 the UE device receives an assignment signal from said macro base station scheduling a transmission on a wireless downlink radio channel corresponding to said macro base station. In some embodiments, the received assignment signal from the macro base station scheduling transmission on a downlink radio channel corresponding to said macro base station is received on a wireless radio control channel. Operation proceeds from step 1816 to step 1818. In step 1818, the UE device receives radio signals communicating traffic data on resources of said downlink radio channel identified by a received assignment signal. Operation proceeds from step 1818 to step 1820 in which the UE device transmits an acknowledgement signal corresponding to said downlink radio channel to said macro base station.

Operation proceeds from steps 1814 and 1820 to step 1808, where additional synchronization signal are detected.

UE device 600 of FIG. 6 is, e.g., UE device 148 of system 1700 of FIG. 17. In some embodiments, UE device 600 implements a method in accordance with flowchart 1800 of FIG. 18.

In various embodiments, processor 602 of UE device 600 is configured to detect a light signal from a visible light communications (VLC) access point, e.g., a light beacon signal communicating a VLC access point identifier, and transmit a radio signal to a macro base statioin indicating that the UE device is in a visible light communications (VLC) coverage area in response to the detected light signal. In some embodiments, the visible light communications access point is an LED access point coupled to a gateway by a powerline communications link. In some embodiments, the visible light communications access point is an LED access point coupled to a gateway by an Ethernet communications link.

In some embodiments, processor 602 is configured to receive an assignment signal from said macro base station scheduling a transmissions on a downlink light channel corresponding to said visible light communications access point. In some such embodiments, said received assignment signal from said macro base station scheduling transmission on a downlink light channel corresponding to said visible light communications access point is received on a wireless radio control channel (e.g., via wireless receiver module 616).

In various embodiments, processor 602 is configured to receive an assignment signal from said macro base station scheduling transmission on a wireless downlink radio channel via a wireless radio control channel (e.g., via wireless receiver module 616). In some such embodiments, processor 602 is further configured to receive synchronization signals used for synchronizing transmission time slots on both said downlink light channel and a radio channel.

In some embodiments, processor 602 is configured to: receive VLC signals communicating traffic data on resources of said downlink light channel identified by a received assignment signal (e.g., via VLC receiver module 606). In some such embodiments, processor 602 is further configured to transmit an acknowledgement signal, corresponding to said downlink light channel, to said macro base station. In some such embodiments, processor 602 is further configured to transmit said acknowledgement signal on a radio uplink channel (e.g., via wireless transmitter module 618). In some such embodiments, the radio uplink channel is synchronized with said downlink light channel.

In various embodiments, the downlink light channel time slots are synchronized with wireline, e.g., powerline, communications time slots used to supply data to said visible light communications access point via a wireline, e.g., powerline, communications link.

Figure 19:
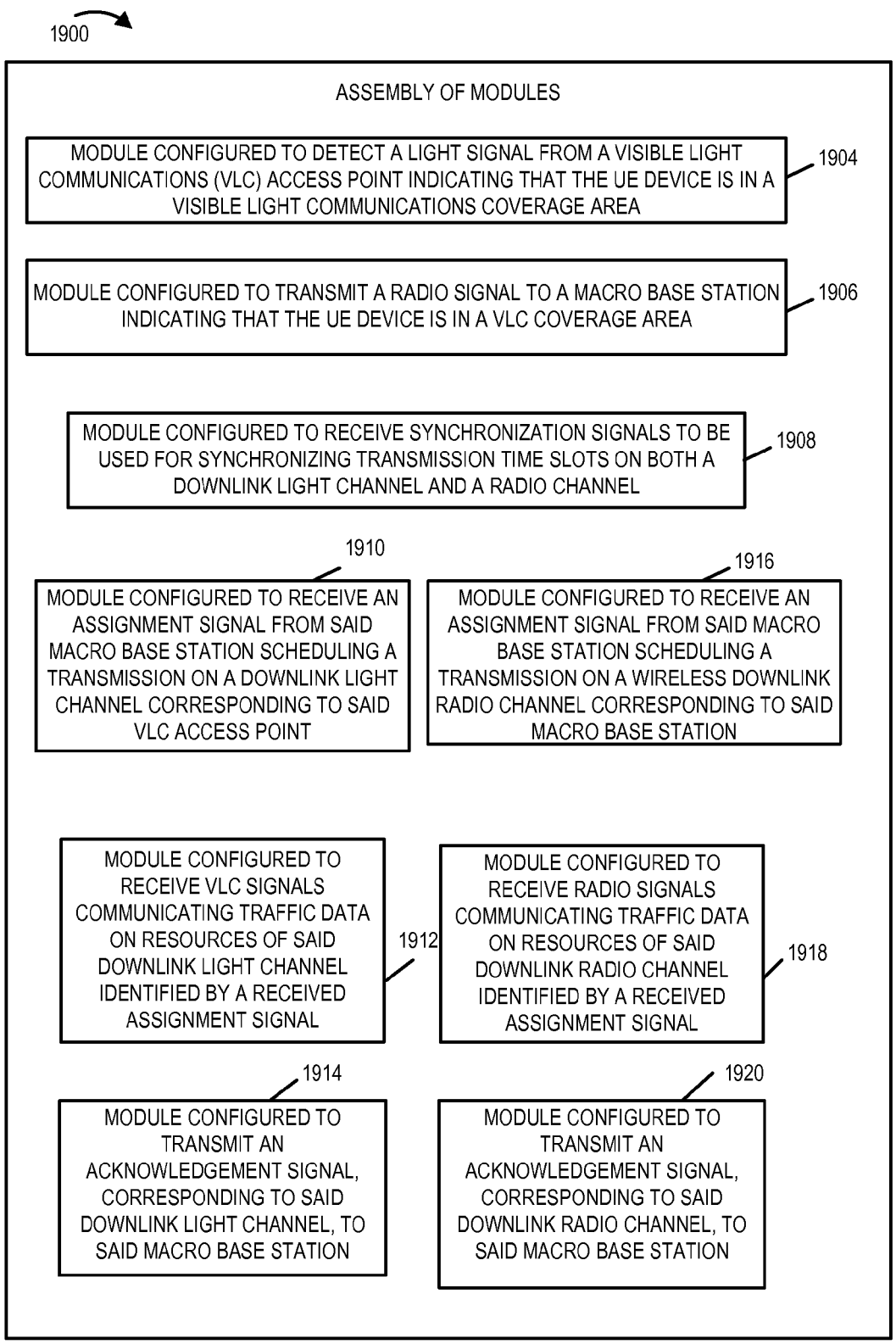
FIG. 19 is an assembly of modules which can, and in some embodiments is, used in the UE device illustrated in FIG. 6.

FIG. 19 is an assembly of modules 1900 which can, and in some embodiments is, used in the UE device 600 illustrated in FIG. 6. The modules in the assembly 1900 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. In some embodiments, some of the modules included in assembly of modules 1900 are included within one or more of VLC receiver module 606 or wireless radio module 608. In various embodiments, one or more of VLC receiver module 606 or wireless radio module 608 is included within processor 602. As should be appreciated the level of integration of modules on the processor and or with some modules being external to the processor may be one of design choice. Alternatively, rather than being implemented as circuits, all or some of the modules may be implemented in software and stored in the memory 604 of UE device 600 shown in FIG. 6 with the modules controlling operation of the UE device 600 to implement the functions corresponding to the modules when the modules are executed by a processor, e.g., processor 602. In still other embodiments, various modules are implemented as a combination of hardware and software, e.g., with a circuit external to the processor 602 providing input to the processor 602 which then under software control operates to perform a portion of a module's function.

While shown in the FIG. 6 embodiment as a single processor 602, e.g., computer, within device 600, it should be appreciated that processor 602 may be implemented as one or more processors, e.g., computers. When implemented in software, the modules include code, which when executed by the processor, configure the processor, e.g., computer, to implement the function corresponding to the module. In some embodiments, processor 602 is configured to implement each of the modules of the assembly of modules 1900. In embodiments where the assembly of modules 1900 is stored in memory 604, and the memory 604 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 19 control and/or configure the device 600 or elements therein such as the processor 602 to perform the functions of the corresponding steps illustrated and/or described in the method of flowchart 1800 of FIG. 18.

FIG. 19 is an exemplary assembly of modules 1900 in accordance with various embodiments. Assembly of modules 1900 includes a module 1904 configured to detect a light signal from a visible light communications (VLC) access point indicating that the UE device is in a visible light communications coverage area, a module 1906 configured to transmit a radio signal to a macro base station indicating that the UE device is in a VLC coverage area, a module 1908 configured to receive synchronization signals to be used for synchronizing transmission time slots on both a downlink light channel and a radio channel. In various embodiments, the VLC access point is a LED access point coupled to a gateway by a powerline communications link. In some embodiments, the VLC access point is a LED access point coupled to a gateway by an Ethernet communications link. Assembly of modules 1900 further includes a module 1910 configured to receive an assignment signal from said macro base station scheduling transmission on a downlink light channel corresponding to the VLC access point, a module 1912 configured to receive VLC signals communicating traffic data on resources of said downlink light channel identified by an assignment signal, and a module 1914 configured to transmit an acknowledgement signal, corresponding to said downlink light channel, to said macro base station. Assembly of modules 1900 further includes a module 1916 configured to receive an assignment signal from said macro base station scheduling a transmission of a wireless downlink radio channel corresponding to said macro base station, a module 1918 configured to receive radio signals communicating traffic data on resources of said downlink radio channel identified by a received assignment signal, and a module 1920 configured to transmit an acknowledgement signal corresponding to said downlink radio channel to said macro base station. In some embodiments, module 1916 is configured to receive the assignment signal via a wireless radio control channel. In various embodiments, the acknowledgement signal, transmitted by module 1920 is transmitted on a radio uplink channel that is synchronized with a downlink light channel. In various embodiments, downlink light channel time slots are synchronized with wireline, e.g, powerline, communications time slots used to supply data to said VLC access point via a wireline, e.g., powerline, communications link.

In various embodiments, a device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., gateways including base stations, e.g., LTE base stations, and including PLC transmit capability, user equipment devices such as stationary nodes and/or mobile nodes such stationary or mobile terminals supporting wireless radio transmit and receive communications capability and VLC receive capability, VLC access point including an LED or LEDs, access points such as base stations, PLC interface devices and/or communications systems. Various embodiments are also directed to methods, e.g., method of controlling and/or operating UE stationary nodes, UE mobile nodes, access points such as wireless base stations and VLC access points, gateways, network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a LTE signaling protocol. Some embodiments are well suited for use with base stations. Some embodiments are well suited for use with peer to peer signaling protocols. Some embodiments use an Orthogonal Frequency Division Multiplexing (OFDM) based wireless peer to peer signaling protocol, e.g., WiFi signaling protocol or another OFDM based protocol. Various embodiments are well suited for communications in indoor environments.

While described in the context of an LTE system, at least some of the methods and apparatus of various embodiments are applicable to a wide range of communications systems including many non-LTE and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with LTE, Code Division Multiple Access (CDMA), OFDM, TDM, and/or various other types of communications techniques which may be used to provide wireless communications links between communications devices. In some embodiments one or more communications devices are implemented as access points which establish communications links with mobile nodes using LTE, OFDM and/or CDMA and/or may provide connectivity to the internet or another network via a wired or wireless communications link. In some embodiments, a wireless communications device, e.g., a mobile node, which implements a method, is embedded in a vehicle. In various embodiments the mobile nodes are implemented as notebook computers, personal data assistants (PDAs), or other portable devices including receiver/transmitter circuits and logic and/or routines, for implementing the methods.

What is claimed is:
1. A method of operating a gateway comprising:
   receiving a signal from a user equipment (UE) device indicating that the UE device is in a visible light communications (VLC) coverage area;
   configuring a visible light communications access point controlled by said gateway as a supplemental wireless cell which supports downlink communications; and transmitting synchronization signals to said UE device used for synchronizing transmission time slots on both a radio uplink channel and a downlink light channel.

2. The method of claim 1, wherein said visible light communications access point is an LED access point coupled to said gateway by a powerline communications link; and
wherein downlink light channel time slots are synchronized with wireline communications time slots used to supply data to said visible light communications access point via the powerline communications link.

3. The method of claim 1, further comprising:
receiving acknowledgment signals corresponding to said downlink light channel from said UE device via said radio uplink channel.

4. The method of claim 3, further comprising:
using a wireless radio control channel to transmit radio channel transmission scheduling information to said user equipment device.

5. The method of claim 1, further comprising:
scheduling transmissions to said UE device on a light channel corresponding to said visible light communications access point; and
using a wireless radio control channel to transmit light channel transmission scheduling information to said user equipment device.

6. A gateway comprising:
means for receiving a signal from a user equipment (UE) device indicating that the UE device is in a visible light communications (VLC) coverage area;
means for configuring a visible light communications access point controlled by said gateway as a supplemental wireless cell which supports downlink communications; and
means for transmitting synchronization signals to said UE device used for synchronizing transmission time slots on both a radio uplink channel and a downlink light channel.

7. The gateway of claim 6, wherein said visible light communications access point is an LED access point coupled to said gateway by a powerline communications link; and
wherein downlink light channel time slots are synchronized with wireline communications time slots used to supply data to said visible light communications access point via the powerline communications link.

8. The gateway of claim 6, further comprising:
means for receiving acknowledgment signals corresponding to said downlink light channel from said UE device via said radio uplink channel.

9. The gateway of claim 8, further comprising:
means for using a wireless radio control channel to transmit radio channel transmission scheduling information to said user equipment device.

10. The gateway of claim 6, further comprising:
means for scheduling transmissions to said UE device on a light channel corresponding to said visible light communications access point; and
means for using a wireless radio control channel to transmit light channel transmission scheduling information to said user equipment device.

11. A computer program product for use in a gateway, the computer program product comprising:
a non-transitory computer readable medium comprising:
code for causing at least one computer to receive a signal from a user equipment (UE) device indicating that the UE device is in an a visible light communications (VLC) coverage area;
code for causing said at least one computer to configure a visible light communications access point controlled by said gateway as a supplemental wireless cell which supports downlink communications; and
code for causing said at least one computer to transmit synchronization signals to said UE device used for synchronizing transmission time slots on both a radio uplink channel and a downlink light channel.

12. A gateway comprising:
at least one processor configured to:
receive a signal from a user equipment (UE) device indicating that the UE device is in a visible light communications (VLC) coverage area;
configure a visible light communications access point controlled by said gateway as a supplemental wireless cell which supports downlink communications; and
transmit synchronization signals to said UE device used for synchronizing transmission time slots on both a radio uplink channel and a downlink light channel; and
memory coupled to said at least one processor.

13. The gateway of claim 12, wherein said visible light communications access point is an LED access point coupled to said gateway by a powerline communications link; and
wherein downlink light channel time slots are synchronized with wireline communications time slots used to supply data to said visible light communications access point via the powerline communications link.

14. The gateway of claim 12, wherein said at least one processor is further configured to:
receive acknowledgment signals corresponding to said downlink light channel from said UE device via said radio uplink channel.

15. The gateway of claim 12, wherein said at least one processor is further configured to:
schedule transmissions to said UE device on a light channel corresponding to said visible light communications access point; and
use a wireless radio control channel to transmit light channel transmission scheduling information to said user equipment device.

16. A method of operating user equipment (UE) device comprising:
detecting a light signal from a visible light communications (VLC) access point;
transmitting a radio signal to a communications device indicating that the UE device is in a visible light communications (VLC) coverage area, wherein said communications device is one of a gateway or a macro base station; and
receiving synchronization signals, from said communications device, used for synchronizing transmission time slots on both a radio uplink channel and a downlink light channel.

17. The method of claim 16, wherein said communications device is a gateway, and
wherein said visible light communications access point is a LED access point coupled to said gateway by a powerline communications link; and
wherein downlink light channel time slots are synchronized with wireline communications time slots used to supply data to said visible light communications access point via the powerline communications link.

18. The method of claim 16, wherein said communications device is a gateway, the method further comprising:

transmitting acknowledgment signals corresponding to said downlink light channel via said radio uplink channel.

19. The method of claim 18, further comprising:
receiving an assignment signal from said gateway scheduling transmission on a wireless downlink radio channel via a wireless radio control channel.

20. The method of claim 16, wherein said communications device is a gateway, the method further comprising:
receiving an assignment signal from said gateway scheduling transmission on the downlink light channel corresponding to said visible light communications access point; and
wherein said received assignment signal from said gateway scheduling transmission of the downlink light channel corresponding to said visible light communications access point is received on a wireless radio control channel.

21. A user equipment (UE) device comprising:
means for detecting a light signal from a visible light communications (VLC) access point; and
means for transmitting a radio signal to a communications device indicating that the UE device is in an a visible light communications (VLC) coverage area, wherein said communications device is one of a gateway or a macro base station; and
means for receiving synchronization signals, from said communications device, used for synchronizing transmission time slots on both a radio uplink channel and a downlink light channel.

22. The user equipment device of claim 21, wherein said communications device is a gateway,
wherein said visible light communications access point is a LED access point coupled to said gateway by a powerline communications link; and
wherein downlink light channel time slots are synchronized with wireline communications time slots used to supply data to said visible light communications access point via the powerline communications link.

23. The user equipment of claim 21, further comprising:
means for transmitting acknowledgment signals corresponding to said downlink light channel via said radio uplink channel.

24. The user equipment device of claim 23, further comprising:
means for receiving an assignment signal from said gateway scheduling transmission on a wireless downlink radio channel via a wireless radio control channel.

25. The user equipment device of claim 21, wherein said communications device is a gateway, the UE device further comprising:
means for receiving an assignment signal from said gateway scheduling a transmissions on the downlink light channel corresponding to said visible light communications access point; and
wherein said received assignment signal from said gateway scheduling transmission on a downlink light channel corresponding to said visible light communications access point is received on a wireless radio control channel.

26. A computer program product for use in a user equipment (UE) device, the computer program product comprising:
a non-transitory computer readable medium comprising:
code for causing at least one computer to detecting a light signal from a visible light communications (VLC) access point;
code for causing said at least one computer to transmit a radio signal to a communications device indicating that the UE device is in a visible light communications (VLC) coverage area, wherein said communications device is one of a gateway or a macro base station; and
code for causing said at least one computer to receive synchronization signals, from said communications device, used for synchronizing transmission time slots on both a radio uplink channel and a downlink light channel.

27. A user equipment (UE) device comprising:
at least one processor configured to:
detect a light signal from a visible light communications (VLC) access point;
transmit a radio signal to a communications device indicating that the UE device is in an a visible light communications (VLC) coverage area, wherein said communications device is one of a gateway or a macro base station; and
receive synchronization signals, from said communications device, used for synchronizing transmission time slots on both a radio uplink channel and a downlink light channel; and
memory coupled to said at least one processor.

28. The UE device of claim 27, wherein said communications device is a gateway, and wherein said visible light communications access point is a LED access point coupled to said gateway by a powerline communications link;
wherein downlink light channel time slots are synchronized with wireline communications time slots used to supply data to said visible light communications access point via the powerline communications link.

29. The UE device of claim 27, wherein said communications device is a gateway, and wherein said at least one processor is further configured to:
transmit acknowledgment signals corresponding to said downlink light channel via said radio uplink channel.

30. The UE device of claim 29, wherein said communications device is a gateway, and wherein said at least one processor is further configured to:
receive an assignment signal from said gateway scheduling a transmissions on the downlink light channel corresponding to said visible light communications access point; and
wherein said received assignment signal from said gateway scheduling transmission on a downlink light channel corresponding to said visible light communications access point is received on a wireless radio control channel.

* * * * *